United States Patent [19]
Kousaka et al.

[11] Patent Number: 5,813,943
[45] Date of Patent: Sep. 29, 1998

[54] CONTROL SYSTEM FOR AUTOMATIC TRANSMISSION

[75] Inventors: Yuuki Kousaka, Nishio; Masahiro Hayabuchi, Anjo; Yoshihisa Yamamoto, Nishio; Hiroshi Tsutsui, Anjo; Yasuhiro Fujita, Hekinan, all of Japan

[73] Assignee: Aisin AW Co., Ltd., Japan

[21] Appl. No.: 644,890

[22] Filed: May 10, 1996

[30] Foreign Application Priority Data

May 12, 1995 [JP] Japan .................................. 7-115014

[51] Int. Cl.⁶ .................................................. F16H 61/06
[52] U.S. Cl. ........................... 477/156; 477/70; 477/115; 477/155
[58] Field of Search .................... 477/70, 77, 79, 477/80, 115, 117, 155, 156

[56] References Cited

U.S. PATENT DOCUMENTS

| | | | |
|---|---|---|---|
| 4,718,525 | 1/1988 | Yamaguchi et al. . | |
| 5,078,028 | 1/1992 | Ishikawa et al. | 477/117 X |
| 5,125,293 | 6/1992 | Takizawa | 477/154 |
| 5,133,230 | 7/1992 | Ito et al. | 477/155 X |
| 5,188,005 | 2/1993 | Sankpal et al. | 477/155 X |
| 5,267,491 | 12/1993 | Sumimoto et al. | 477/155 |
| 5,272,630 | 12/1993 | Brown et al. . | |
| 5,343,782 | 9/1994 | Jamzadeh . | |
| 5,363,724 | 11/1994 | Asahara . | |
| 5,368,531 | 11/1994 | Ando et al. | 477/155 |
| 5,382,201 | 1/1995 | Iizuka | 477/155 X |
| 5,393,275 | 2/1995 | Okada et al. | 477/81 |
| 5,429,561 | 7/1995 | Wakahara et al. | 477/156 |
| 5,462,501 | 10/1995 | Bullmer et al. | 477/155 |
| 5,522,779 | 6/1996 | Tabata et al. | 477/126 |
| 5,547,436 | 8/1996 | Hayabuchi et al. | 477/114 |
| 5,583,768 | 12/1996 | Hamajima et al. | 477/83 X |
| 5,586,954 | 12/1996 | Iwata et al. | 477/114 X |
| 5,649,880 | 7/1997 | Tsutsui et al. | 477/80 X |

FOREIGN PATENT DOCUMENTS

| | | |
|---|---|---|
| 0479349 | 4/1992 | European Pat. Off. . |
| 0545298 | 6/1993 | European Pat. Off. . |
| 0588443 | 3/1994 | European Pat. Off. . |
| 0588627 | 3/1994 | European Pat. Off. . |
| 3-28571 | 2/1991 | Japan . |

Primary Examiner—Charles A. Marmor
Assistant Examiner—Peter T. Kwon
Attorney, Agent, or Firm—Lorusso & Loud

[57] ABSTRACT

A control system for an automatic transmission includes: a clutch adapted to be applied when a forward running range is selected, to transmit the rotation of an engine to the transmission mechanism of a speed change unit and a hydraulic servo for applying/releasing the clutch. A control unit controls oil pressure fed to the hydraulic servo and includes: an application starting pressure detector for detecting application starting pressure at the instant when the application of the clutch is started; an initial application pressure setter for setting an initial application pressure on the basis of the detected application starting pressure; and an oil pressure regulator for adjusting the oil pressure fed to the hydraulic servo, when a change is made to a forward running range, and then gradually raising that oil pressure. The application starting pressure detected by the application starting pressure detector is the value at which the application of the clutch is actually started, so that the initial application pressure can be properly set even if the actual oil pressure fed to the hydraulic servo regardless of the urging force of a return spring or variation in manufacture of the hydraulic control system.

13 Claims, 23 Drawing Sheets

FIG. 3

| | Solenoid | | | Clutch | | | Brake | | | | One-Way Clutch | | |
|---|---|---|---|---|---|---|---|---|---|---|---|---|---|
| | S1 | S2 | S3 | C1 | C2 | C3 | B1 | B2 | B3 | B4 | F1 | F2 | F3 |
| R | × | ○ | × | × | ○ | × | × | × | ○ | ○ | × | × | × |
| N | × | ○ | × | × | × | × | × | × | × | ○ | × | × | × |
| D 1ST | × | ○ | △ | ○ | × | × | × | × | (○) | ○ | × | ○ | ○ |
| D 2ND | ○ | ○ | △ | ○ | × | × | ○ | ○ | × | ○ | ○ | × | ○ |
| D 3RD | ○ | × | × | ○ | × | ○ | ○ | ○ | × | × | ○ | × | × |
| D 4TH | × | × | × | ○ | ○ | ○ | × | ○ | × | × | × | × | × |

CONTROL SYSTEM FOR AUTOMATIC TRANSMISSION

BACKGROUND OF THE INVENTION

1. Field of the Invention

The present invention relates to an automatic transmission of a vehicle and, more particularly, to a control system for the automatic transmission.

2. Related Art

In the prior art, the automatic transmission is provided with a torque converter acting as a fluid transmission unit for receiving the rotation generated by an engine, and a speed change unit for changing the speed of the rotation transmitted from the torque converter. The speed change unit is equipped with a planetary gear unit composed of a plurality of gear elements, so that it may change the speed in accordance with the shift pattern which is set in advance in a manner to correspond to a vehicle speed and a throttle opening.

The automatic transmission allows selection of any of a P (parking) range, an R (reverse) range, an N (neutral) range, a D (drive) range, a 3rd (third) range, a 2nd (second) range, and a 1st (low) range. When the range is to be changed (hereinafter a "N-D change") by moving a speed selector unit such as a shift lever from the N-range to a forward running range such as the D-range, the 3rd range, the 2nd range or the 1st range, the oil pressure fed to the hydraulic servo of a first clutch is raised. In this case, the oil pressure fed to the hydraulic servo is raised not abruptly but according to predetermined characteristics, once it is raised to an initial application pressure (as disclosed in Japanese Patent Laid-Open No. 28571/1991).

If, in this case, the initial application pressure is set to such a value that the power transmission by the first clutch is started at the completion of the piston stroke, the first clutch is not abruptly applied, and time after completion of the piston stroke can be shortened to eliminate the delay in the engagement.

In the control system for an automatic transmission described above, however, the oil pressure at the instant when the piston stroke of the hydraulic servo is completed to start the application of the first clutch depends on the urging force of the individual return spring(s) which bias the piston of the hydraulic servo and the urging force will vary somewhat as between different springs, even if all are manufactured together in the same manner. Even if an electric signal is used to generate a target oil pressure for starting the application of the first clutch, the actual oil pressure fed to the hydraulic servo is subject to variations which occur in manufacture of the hydraulic control system.

This makes it difficult to generate the initial, preset application pressure. If this initial application pressure is excessively low, the time period required to complete application of the first clutch becomes excessively long. If, on the other hand, the accelerator pedal is depressed simultaneously with the N-D change (hereinafter "N-D simultaneous depression"), the application of the first clutch is delayed, although the throttle opening increases, so that the first clutch is applied after engine racing, causing application shock.

Under an excessively high initial application pressure, on the other hand, the application of the first clutch is abruptly started also causing shock.

SUMMARY OF THE INVENTION

The present invention has as its object solution of the aforementioned problems of the control systems of the prior art and provision of a control system for an automatic transmission, which can produce an initial application pressure, as preset.

To accomplish this object, the present invention provides a control system for an automatic transmission which includes: a clutch adapted to be applied when a forward running range is selected, to transmit the rotation of the engine to the transmission mechanism of a speed change unit; a hydraulic servo for applying/releasing the clutch; and a control unit for controlling the oil pressure fed to the hydraulic servo.

The control unit includes: application starting pressure detecting means for detecting the application starting pressure at the instant when the application of the clutch is started; initial application pressure setting means for setting an initial application pressure on the basis of the application starting pressure which is detected by the application starting pressure detecting means; and oil pressure adjusting means for adjusting the oil pressure fed to the hydraulic servo when a change is made to the forward running range, and then raising the same gradually.

The application starting pressure, as detected by the application starting pressure detecting means, takes the value at which the application of the clutch is actually started, so that the initial application pressure can be properly set regardless of the actual oil pressure fed to the hydraulic servo which will vary somewhat from unit to unit due to variations in manufacture of the return spring and of the hydraulic control unit itself. As a result, the clutch can always be stably applied, with elimination, not only of the delay in engagement of the clutch, but also of an abrupt start of engagement to thereby prevent the occurrence of application shock.

The control system for an automatic transmission according to the present invention may further include: a fluid transmission unit arranged between the engine and the clutch; input RPM detecting means for detecting the RPM of input to the fluid transmission unit; output RPM detecting means for detecting the RPM of output from the fluid transmission unit; and stop state detecting means for detecting satisfaction of a set of conditions including: the forward running range has been selected, the throttle opening is fully closed, the brake pedal is depressed and the vehicle speed is substantially zero.

If it is decided by the stop state detecting means that the forward running range has been selected, that the throttle opening is fully closed, that the brake pedal is depressed and that the vehicle speed is substantially zero, the neutral control is started. Then, the release means releases the clutch by lowering the oil pressure fed to the hydraulic servo until the retraction of the piston of the hydraulic servo is started.

The control unit may include: calculation means for calculating the difference between the input RPM and the output RPM; release means for releasing the clutch by lowering the oil pressure fed to the hydraulic servo until the retraction of the piston of the hydraulic servo has started, if the vehicle stop state is detected; and specific release state holding means for holding the state immediately before transition of the clutch from operation in a drag region to operation in a slip region, until the vehicle stop state is no longer detected after the release of the clutch.

The above-mentioned specific release state holding means includes: booster means for raising the oil pressure fed to the hydraulic servo, by a set pressure, unless the rate of change of the difference between the input and output rotational speeds exceeds a reference rate of change, even after lapse of a set time period; and first pressure reducing means for lowering the oil pressure fed to the hydraulic servo, by a set pressure if the rate of change exceeds the reference rate, irrespective of the lapse of the set time, and if the difference between rotational input and output speeds increases.

The booster means decides that the clutch is in the drag region if the rate of change of the rotational difference does not exceed the reference rate of change, and raises the oil pressure fed to the hydraulic servo by a set pressure increment. On the other hand, the first pressure reducing means decides that the clutch is in the slip region, if the rate of change exceeds the reference rate of change, irrespective of the lapse of the set time, and if the rotational difference increases, and lowers the oil pressure fed to the hydraulic servo by the set pressure.

Thus, the oil pressure fed to the hydraulic servo is lowered at the instant of the transfer of the clutch from the drag region to the slip region, so that it is always held in the state immediately preceding the transition from the drag region to the slip region.

As a result, when the vehicle is in the stop state, the neutral control can be effected by setting the clutch in the state immediately preceding application, so that the load to be applied to the engine can be lightened to reduce the fuel consumption of the engine and thereby improve fuel economy.

In another embodiment of the present invention, the application starting pressure detecting means detects, when the oil pressure fed to the hydraulic servo is first raised by a set pressure by the booster means and then lowered by a set pressure by the first pressure reducing means, the oil pressure immediately prior to the latter lowering, as the application starting pressure.

In this case, the application starting pressure, as detected by the application starting pressure detecting means, is a value at which the application of the clutch is actually started, because it is the oil pressure before it is lowered by the set pressure by the first pressure reducing means. As a result, the initial application pressure can be properly set, regardless of variations in the actual oil pressure fed to the hydraulic servo due to variations in the return spring and/or the oil feed in the hydraulic control system introduced in manufacture.

Furthermore, the final pressure established by neutral control can be utilized as the application starting pressure so that the application starting pressure detecting means for the N-D change control may be omitted. This makes it possible to simplify the control unit.

As a result, the clutch can always be stably applied with neither delay nor abrupt start so that application shock can be prevented.

In still another embodiment of the present invention, the reference rate of change is set at a value between a standard rate of change for when the clutch is in the drag region and a standard rate of change for when the clutch is in the slip region. It is thus possible to easily decide whether the clutch is in the drag region or in the slip region.

In a preferred embodiment of the present invention, the set time period is set to correspond to the time from when the oil pressure to be fed to the hydraulic servo begins to change, until the actual rate of change of the oil pressure ends. Since the delay in the rise of the oil pressure in the hydraulic servo has been eliminated, the delay is not accumulated and overshooting is thereby prevented at the time of the transition of the clutch from the drag region to the slip region. This feature also makes it possible to prevent the piston of the hydraulic servo from retracting more than necessary.

In other preferred embodiments, the release means includes second pressure reducing means for reducing the oil pressure fed to the hydraulic servo if the rate of change exceeds the reference rate of change and if the difference between the rotational speeds decreases. In this manner, the clutch can be properly released without fail.

The control system according to the present invention may further include torque detecting means for detecting the output torque from the engine. Another option is oil temperature detecting means for detecting the oil temperature.

Moreover, the initial application pressure setting means adds an additional pressure to a reference pressure, and this additional pressure may be increased with increase in output torque. Alternatively or additionally, this additional pressure may be lowered responsive to an increase in oil temperature. As a result, a stable engagement state can be established without being influenced by the output torque, to prevent engagement delay and abrupt engagement.

In another embodiment the control system according to the present invention further includes application detecting means for detecting the start of application of the clutch. The oil pressure adjusting means sets the oil pressure to be fed to the hydraulic servo to the initial application pressure, until the start of application is detected by the application detecting means, and then raises that oil pressure gradually from the initial application pressure.

BRIEF DESCRIPTION OF THE DRAWINGS

FIG. 3 is a table enumerating the operations of the automatic transmission in the embodiment of FIGS. 1 and 2;

DESCRIPTION OF THE PREFERRED EMBODIMENT

Embodiments of the present invention will be described below in detail with reference to the accompanying drawings.

Figure 1:
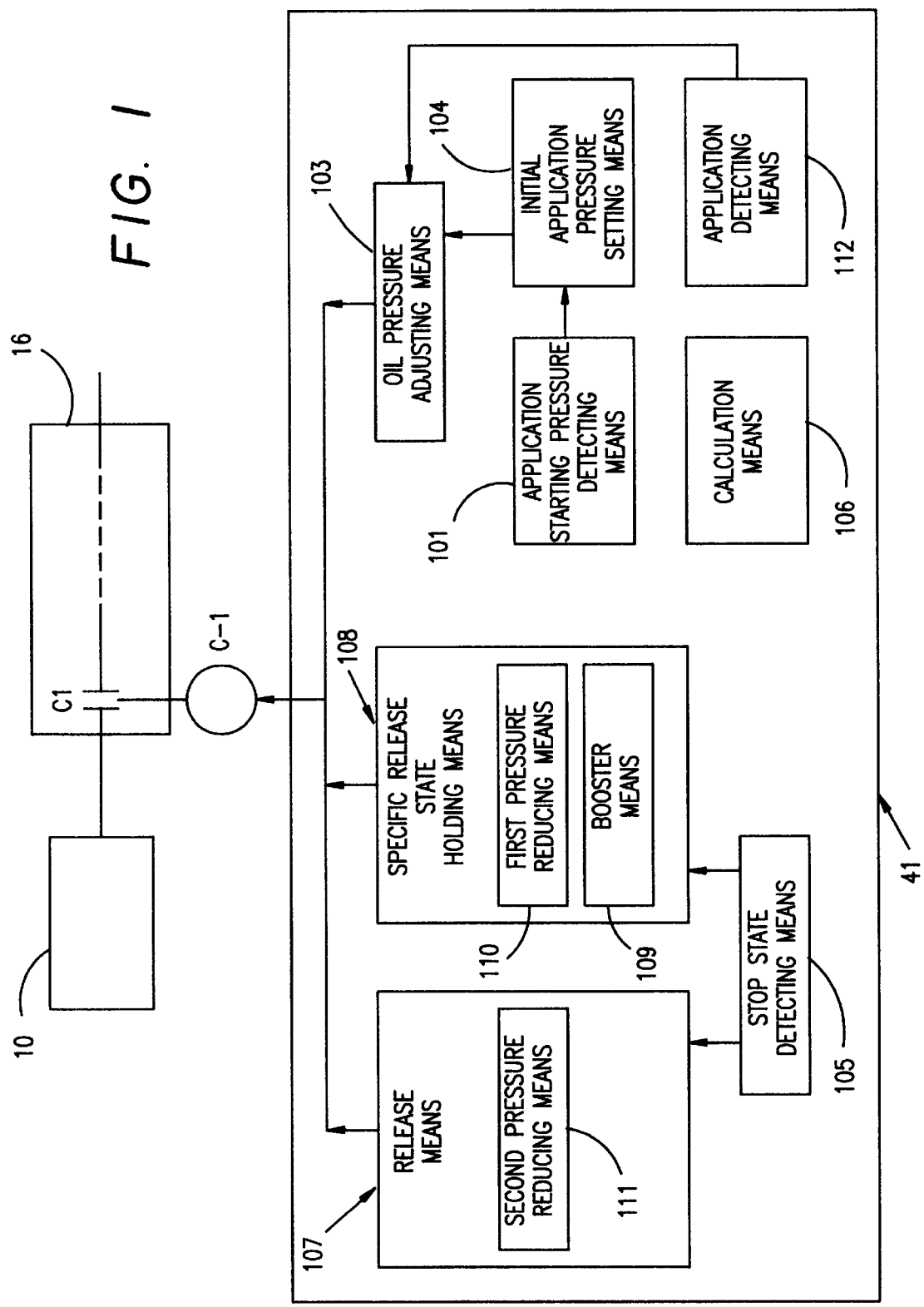
FIG. 1 is a block diagram of an embodiment of a control system for an automatic transmission in accordance with the present invention.

Referring to FIG. 1: reference numeral 10 designates an engine; numeral 16 a speed change unit; and C1 designates a first clutch serving as the clutch which is applied, when a forward running range is selected, to transmit the rotation from the engine 10 to the transmission mechanism of the speed change unit 16.

An automatic transmission control unit 41 controls oil pressure fed to a hydraulic servo C-1 to apply/release the first clutch C1. The automatic transmission control system 41 includes: application starting pressure detecting means 101 for detecting application starting pressure at the instant when the application of the first clutch C1 is started and initial application pressure setting means 104 for setting an initial application pressure on the basis of the application starting pressure detected by the application starting pressure detecting means 101. Oil pressure adjusting means 103 adjusts the oil pressure fed to the hydraulic servo C-1, responsive to a change in the forward running range, and raises that pressure gradually. Application detecting means 112 detects the start of application of the clutch. The oil pressure adjusting means 103 sets the oil pressure to be fed to the hydraulic servo C-1 to the initial application pressure, until the start of application is detected by the application detecting means 112, and then raises that oil pressure gradually from the initial application pressure.

Stop state detecting means 105 is included within the control unit 41 for detecting satisfaction of a set of conditions including: the forward running range has been selected, the throttle opening is fully closed, the brake pedal is depressed and the vehicle speed is substantially zero. If it is decided by the stop state detecting means 105 that the forward running range has been selected, that the throttle opening is fully closed, that the brake pedal is depressed and that the vehicle speed is substantially zero, a "stop state" is decided and the neutral control is started.

FIG. 1 shows the control unit 41 as further including: calculation means 106 for calculating the difference between the input RPM and the output RPM for torque converter 12 (FIG. 2); release means 107 for releasing the clutch by lowering the oil pressure fed to the hydraulic servo C-1 until the retraction of the piston of the hydraulic servo has started, if the vehicle stop state is detected; and specific release state holding means 108 for holding the state immediately before transition of the clutch C1 from operation in a drag region to operation in a slip region, until the vehicle stop state is no longer detected after the release of the clutch.

The above-mentioned specific release state holding means 108, in turn, includes: booster means 109 for raising the oil pressure fed to the hydraulic servo C-1, by a set pressure, unless the rate of change of the difference between the input and output rotational speeds exceeds a reference rate of change, even after lapse of a set time period; and first pressure reducing means 110 for lowering the oil pressure fed to the hydraulic servo C-1, by a set pressure if the rate of change exceeds the reference rate, irrespective of the lapse of the set time, and if the difference between rotational input and output speeds increases.

The release means 107 includes second pressure reducing means 111 for reducing the oil pressure fed to the hydraulic servo C-1 if the rate of change exceeds the reference rate of change and if the difference between the rotational speeds decreases. In this manner, the clutch C1 can be properly released without fail.

Figure 2:
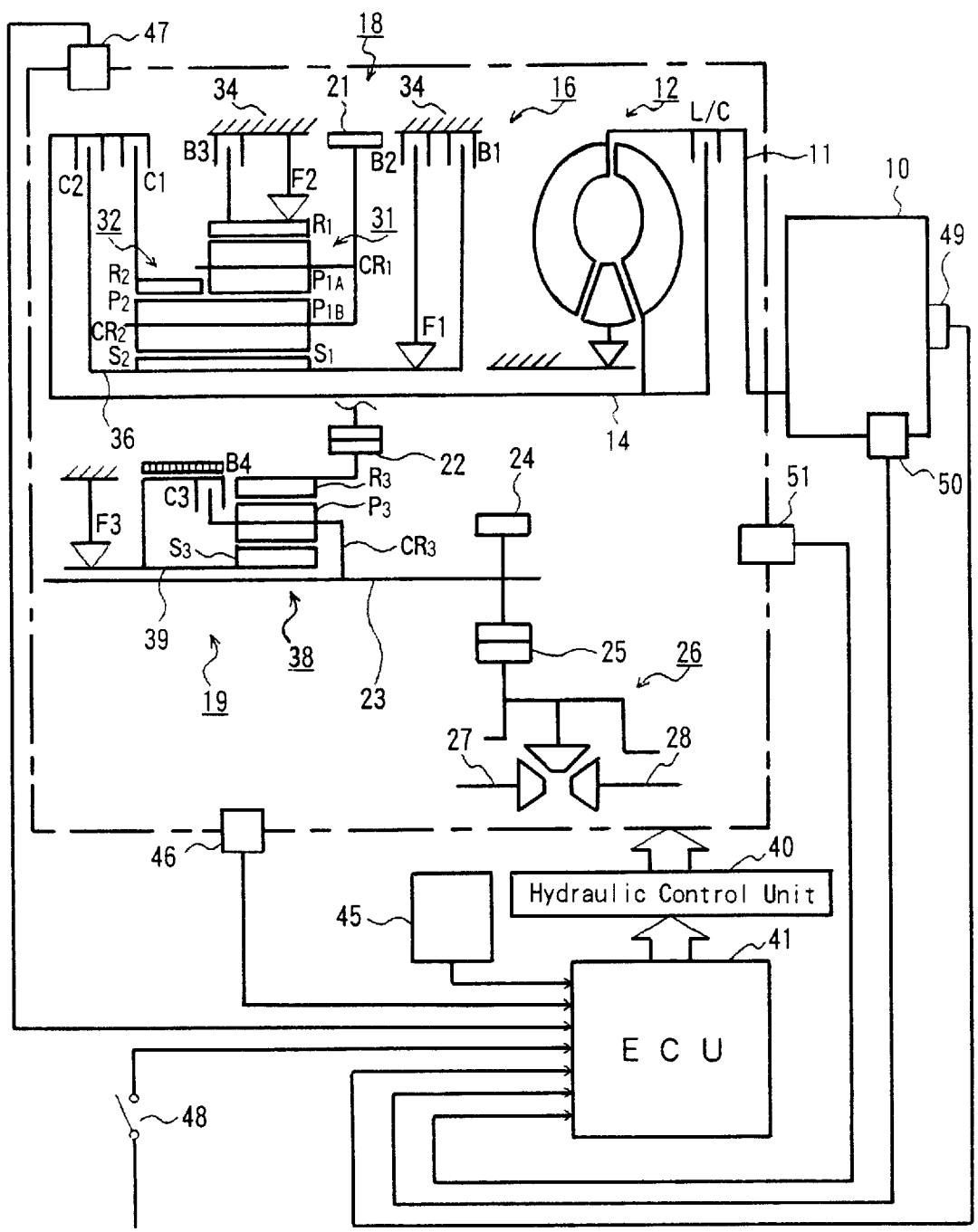
FIG. 2 is a schematic diagram of the embodiment of the control system of FIG. 1.

As shown in FIG. 2, the rotation output by the engine 10 is transmitted through an output shaft 11 to the torque converter 12. This torque converter 12 transmits the rotation of the engine 10 to an output shaft 14 through a fluid (or working oil) but is also able to transmit the rotation directly to the output shaft 14, when the vehicle speed exceeds a predetermined value, by application of a lockup clutch L/C.

To the output shaft 14 is connected a speed change unit 16 for establishing four forward and one reverse speeds. This speed change unit 16 includes a main transmission 18 for three forward and one reverse speeds and an under-drive auxiliary transmission 19. The rotation of the main transmission 18 is transmitted through a counter drive gear 21 and a counter driven gear 22 to the auxiliary transmission 19, and the rotation of the output shaft 23 of the auxiliary transmission 19 is transmitted through an output gear 24 and a ring gear 25 to a differential mechanism 26.

In this differential mechanism 26, the rotation, as received from the output gear 24 and the ring gear 25, is differentiated so that different rotations are transmitted through lefthand and righthand drive shafts 27 and 28 to the not-shown drive wheels.

The main transmission 18 is equipped with a first planetary gear unit 31 and a second planetary gear unit 32 and further with the first clutch C1, a second clutch C2, a first brake B1, a second brake B2, a third brake B3, a one-way clutch F1 and a one-way clutch F2 for transmitting the torque selectively between the individual elements of the two planetary gear units 31 and 32.

The first planetary gear unit 31 is composed of: a ring gear $R_1$ connected to a drive unit casing 34 through the third brake B3 and the one-way clutch F2 which are arranged in parallel with each other; a sun gear $S_1$ formed on a sun gear shaft 36 fitted on and rotatably supported by the output shaft 14; a carrier CR1 connected to the counter drive gear 21; and pinions $P_{1A}$ and $P_{1B}$ meshing between the ring gear $R_1$ and the sun gear $S_1$ and rotatably supported by the carrier $CR_1$.

The sun gear shaft 36 is connected through the second clutch C2 to the output shaft 14. The sun gear shaft 36 is further connected through the first brake B1 to the drive unit casing 34 and through the one-way clutch F1 and the second brake B2, arranged in series, to the drive unit casing 34.

On the other hand, the second planetary gear unit 32 is composed of: a ring gear $R_2$ connected through the first clutch C1 to the output shaft 14; a sun gear $S_2$ formed on the sun gear shaft 36 integrally with the sun gear $S_1$; a carrier $CR_2$ connected to the carrier $CR_1$; and a pinion $P_2$ meshing between the ring gear $R_2$ and the sun gear $S_2$, rotatably supported by the carrier $CR_2$ and formed integrally with the pinion $P_{1B}$.

The counter drive gear 21 meshes with the counter driven gear 22 arranged in the auxiliary transmission 19, to transmit rotation, at the speed established by the main transmission 18, to the auxiliary transmission 19.

Auxiliary transmission 19 is equipped with a third planetary gear unit 38, and with a third clutch C3, a fourth brake B4 and a one-way clutch F3 for transmitting the torque selectively between the individual elements of the third planetary gear unit 38.

The third planetary gear unit 38 is composed of: a ring gear $R_3$ connected to the counter driven gear 22; a sun gear $S_3$ formed on a sun gear shaft 39 rotatably fitted on the output shaft 23; a carrier $CR_3$ fixed on the output shaft 23; and a pinion $P_3$ meshing 20 between the ring gear $R_3$ and the sun gear $S_3$ and rotatably supported by the carrier $CR_3$.

FIG. 3 describes the operations of the automatic transmission described above. In FIG. 3: S1 designates a first solenoid valve; S2 a second solenoid valve; S3 a third solenoid valve; C1 the first brake; C2 the second clutch; C3 the third clutch; B1 the first brake; B2 the second brake; B3 the third brake; B4 the fourth brake; and F1 to F3 the one-way clutches. Moreover: R designates the R-range; N the N-range; D the D-range; 1ST a 1st-speed gear stage; 2ND a 2nd-speed gear stage; 3RD a 3rd-speed gear stage; and 4TH a 4th-speed gear stage. Symbol O indicates that a first solenoid signal $S_1$, a second solenoid signal $S_2$ and/or a third solenoid signal $S_3$ for opening/closing the first solenoid valve S1, the second solenoid valve $S_2$ and the third solenoid valve S3, respectively, are ON, that the first clutch C1, the second clutch C2, the third clutch C3, the first brake B1, the second brake B2, the third brake B3 and/or the fourth brake B4 are applied, and that the one-way clutches F1 to F3 are locked. On the other hand, symbol X indicates that the first solenoid signal $S_1$, the second solenoid signal $S_2$ and the third solenoid signal $S_3$ for opening/closing the first solenoid valve S1, the second solenoid valve S2 and the third solenoid valve S3 are OFF, that the first clutch C1, the second clutch C2, the third clutch C3, the first brake B1, the second brake B2, the third brake C3 and/or the fourth brake B4 are released, and that the one-way clutches F1 to F3 are free. Symbol Δ indicates the neutral control state for the first solenoid signal $S_1$, the second solenoid signal $S_2$ and the third solenoid signal $S_3$. Finally, symbol (O) indicates that the third brake B3 is applied for engine braking.

In 1st speed in the D-range, the first clutch C1 and the fourth brake B4 are applied to lock the one-way clutches F2 and F3. Then, the rotation of-the output shaft 14 is transmitted through the first clutch C1 to the ring gear $R_2$. In this state, the rotation of the ring gear $R_1$ is blocked by the one-way clutch F2 so that the carrier $CR_2$ is drastically decelerated, while rotating the sun gear $S_2$ at idle, and transmits its rotation to the counter driven gear 21.

The rotation, as transmitted from the counter drive gear 21 to the counter driven gear 22, is further transmitted to the ring gear $R_3$. However, the rotation of the sun gear $S_3$ is blocked by the fourth brake B4 so that the rotation of the carrier $CR_3$ is further decelerated and transmitted to the output shaft 23.

At the 2nd speed in the D-range, on the other hand, the first clutch C1, the first brake B1, the second brake B2 and the fourth brake B4 are applied to lock the one-way clutches F1 and F3. Then, the rotation of the output shaft 14 is transmitted through the first clutch C1 to the ring gear $R_2$. The rotation of this ring gear $R_2$ is decelerated and transmitted to the carrier $CR_2$, because the rotation of the sun gear $S_2$ is blocked by the second brake B2 and the one-way clutch F1. The rotation of the carrier $CR_2$ is transmitted to the counter drive gear 21 while rotating the ring gear $R_1$ at idle.

The rotation, as transmitted from the counter drive gear 21 to the counter driven gear 22, is further transmitted to the ring gear $R_3$. However, the rotation of the sun gear $S_3$ is blocked by the fourth brake B4 so that the rotation of the carrier $CR_3$ is decelerated and transmitted to the output shaft 23.

Next, at the 3rd speed in the D-range, the first clutch C1, the third clutch C3, the first brake B1 and the second brake B2 are applied to lock the one-way clutch F1. Then, the rotation of the output shaft 14 is transmitted through the first clutch C1 to the ring gear $R_2$. The rotation of this ring gear $R_2$ is decelerated and transmitted to the carrier $CR_2$ because the rotation of the sun gear $S_2$ is blocked by the second brake B2 and the one-way clutch F1. The rotation of the carrier $CR_2$ is transmitted to the counter drive gear 21 while rotating the ring gear $R_1$ at idle.

The rotation, as transmitted from the counter drive gear 21 to the counter driven gear 22, is further transmitted to the ring gear $R_3$. However, the relative rotation between the carrier $CR_3$ and the sun gear $S_3$ is blocked by the third clutch C3 so that the third planetary gear unit 38 comes into a direct-coupled state. As a result, the rotation of the counter driven gear 22 is transmitted without change in speed to the output shaft 23.

Next, at the 4th speed in the D-range, the first clutch C1, the second clutch C2, the third clutch C3 and the second brake B2 are applied. Then, the rotation of the output shaft 14 is transmitted through the first clutch C1 to the ring gear $R_2$ and through the second clutch C2 to the sun gear $S_2$ to bring the first planetary gear unit 31 and the second planetary gear unit 32 into direct-coupled states. As a result, the rotation of the output shaft 11 is transmitted without change in speed to the counter drive gear 21.

The rotation, as transmitted from the counter drive gear 21 to the counter driven gear 22, is further transmitted to the ring gear $R_3$. However, the relative rotation between the carrier $CR_3$ and the sun gear $S_3$ is blocked by the third clutch C3 so that the third planetary gear unit 38 comes into the direct-coupled state. As a result, the rotation of the counter driven gear 22 is transmitted without change in speed to the output shaft 23.

The automatic transmission is provided with a hydraulic control unit 40 for establishing the individual gear stages by applying/releasing the first clutch C1, the second clutch C2, the third clutch C3, the first brake B1, the second brake B2, the third brake B3 and the fourth brake B4.

Moreover, the hydraulic control unit 40 and the engine control unit 43 are connected with the automatic transmission control system (ECU) 41 so that they are operated according to the control program of the automatic transmission control system 41.

The automatic transmission control system 41 receives individual signals from a neutral start switch (N.S.S.W.) 45, an oil temperature sensor 46 acting as oil temperature detecting means, the RPM sensor 47 acting as output RPM detecting means, a brake switch 48, the engine RPM sensor 49 acting as input RPM detecting means and torque detecting means, a throttle opening sensor 50 and a vehicle speed sensor 51.

Moreover, the position of the shift lever (not shown), i.e., the selected range, can be detected by the neutral start switch 45. The temperature of the oil in the hydraulic control unit 40 is detected by the oil temperature sensor 46. Clutch input side RPM $N_{C1}$ can be detected as the output RPM of the torque converter 12 by the RPM sensor 47.

Furthermore, whether or not the brake pedal (not shown) is depressed is detected by the brake switch 48. Engine RPM $N_E$ is detected as the output RPM of the torque converter 12 by the engine RPM sensor 49. The throttle opening θ is detected by the throttle opening sensor 50. The output side RPM (hereinafter the "speed change unit side output RPM") of the speed change unit 16, namely, the vehicle speed, is detected by the vehicle speed sensor 51.

Figure 4:
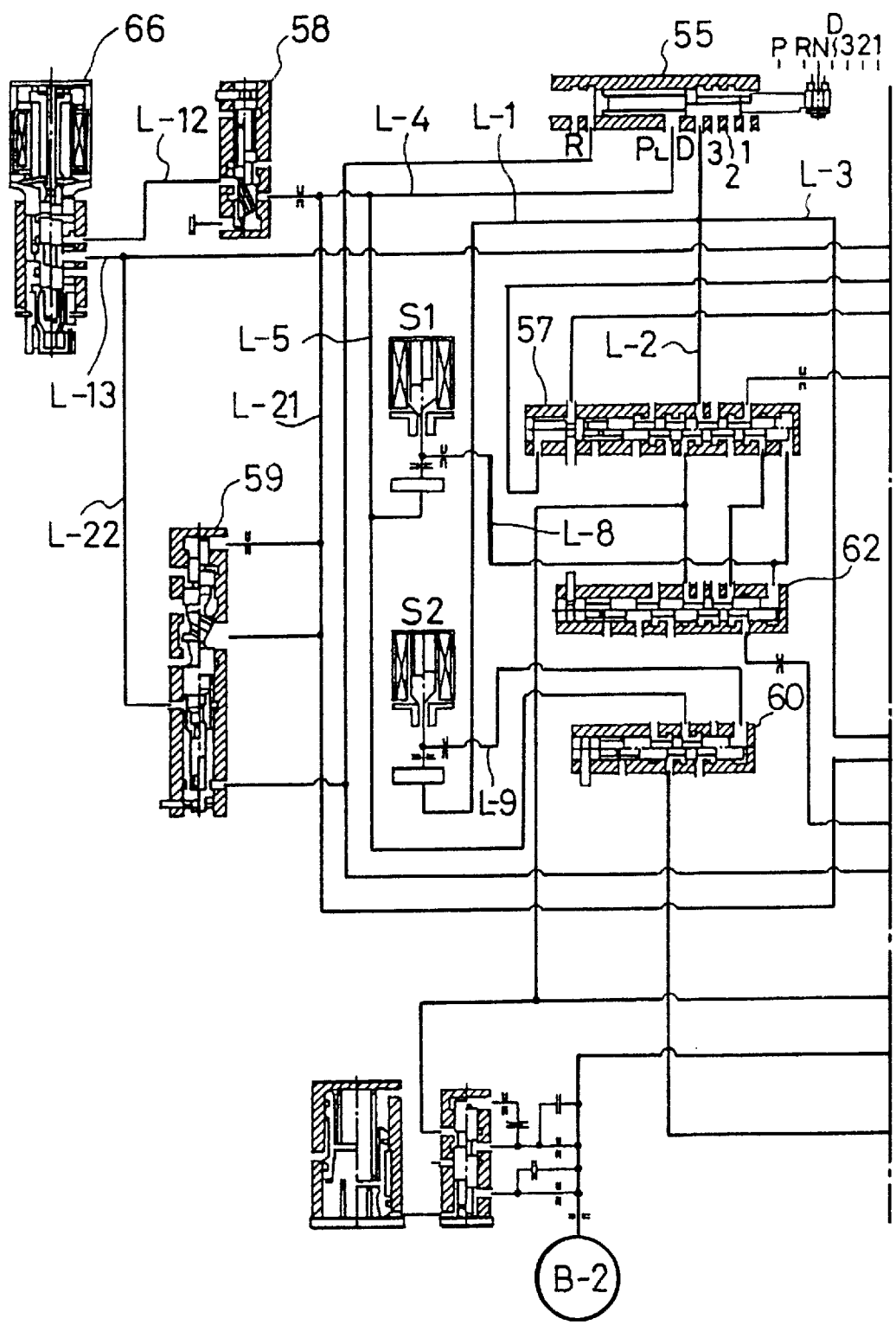
FIG. 4 is a partial first hydraulic circuit diagram for a hydraulic control unit which may be utilized in the embodiment of FIGS. 1 and 2.
Figure 5:
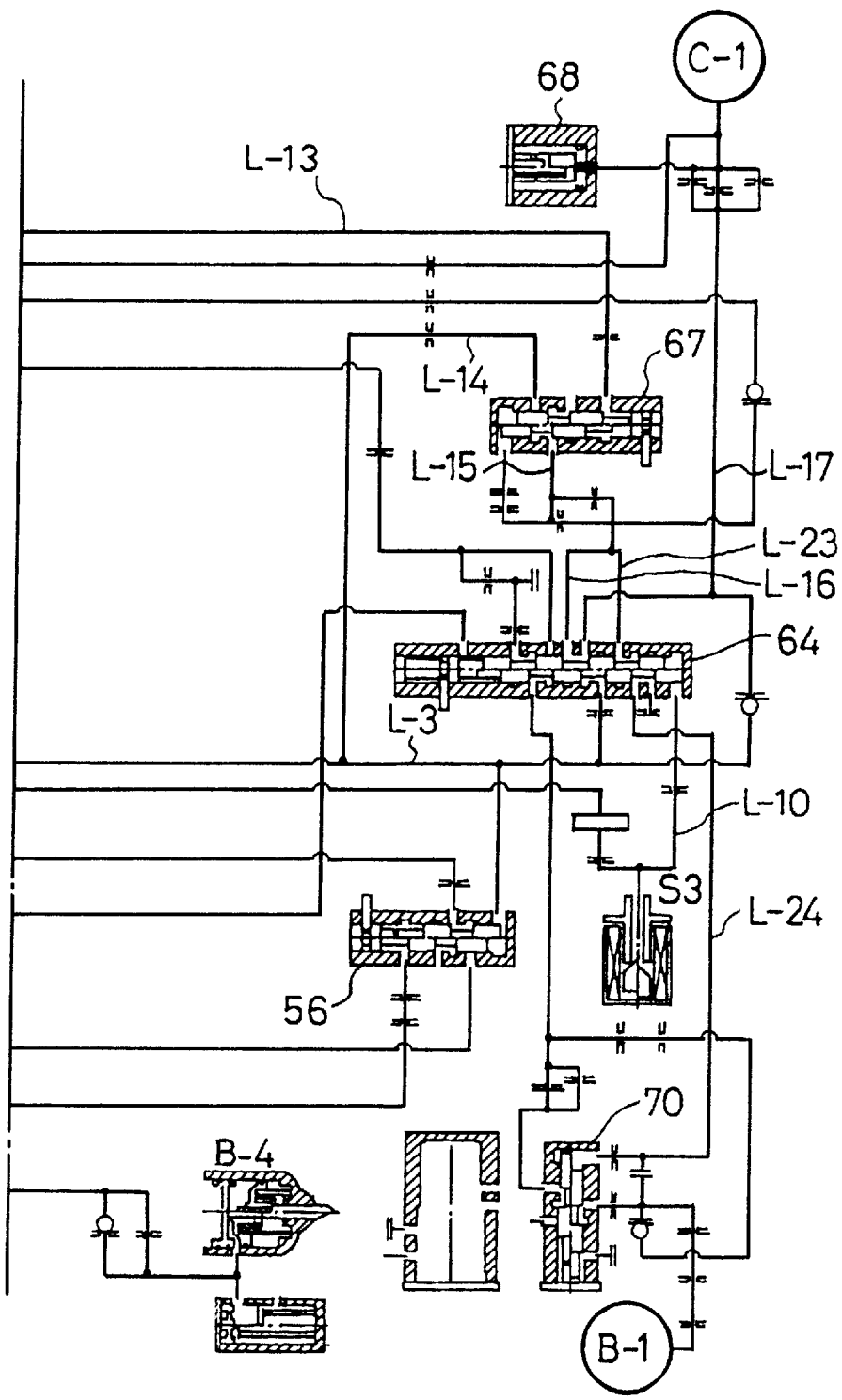
FIG. 5 shows the remainder of the first hydraulic circuit diagram of FIG. 4.

FIGS. 4 and 5 show hydraulic control unit 40 in the embodiment of the present invention wherein a primary valve 59 regulates the oil pressure coming from the oil pressure source (not shown) and outputs it as a line pressure to an oil line L-21. Moreover, a manual valve 55 is provided with ports 1, 2, 3, D, $P_L$ and R so that the line pressure, as fed from the primary valve 59 through oil lines L-21 and L4 to the port $P_L$, is established as a 1-range pressure, a 2-range pressure, a 3-range pressure, a forward running range pressure (hereinafter the "D-range pressure") and an R-range pressure, at the respective ports 1, 2, 3, D and R, by manipulating the shift lever (not shown).

When the shift lever is placed in the forward running range position, the D-range pressure oil, as established in the port D, is fed through an oil line L-1 to the second solenoid valve S2, through an oil line L-2 to a 1-2 shift valve 57, and through an oil line L-3 to a B-1 sequence valve 56. On the other hand, the line pressure from the primary valve 59 is fed through the oil line L-21 to the third solenoid valve S3.

Moreover, the line pressure from the oil line L21 is fed through the oil line L-4 to a solenoid modulator valve 58 and through an oil line L-5 to the first solenoid valve S1 and a 2-3 shift valve 60.

The first solenoid signal $S_1$, the second solenoid signal $S_2$ and the third solenoid signal $S_3$ for opening/closing, respectively, the first solenoid valve S1, the second solenoid valve S2 and the third solenoid valve S3 are turned ON/OFF in response to a change-over signal coming from the automatic transmission control system 41 (FIG. 2). As a result, the first solenoid valve S1 feeds a signal oil pressure through an oil line L-8 to the 1-2 shift valve 57 and a 3-4 shift valve 62. The second solenoid valve S2 feeds a signal oil pressure through an oil line L-9 to the 2-3 shift valve 60. The third solenoid valve S3-feeds a change-over signal oil pressure through an oil line L-10 to a neutral relay valve 64.

The 1-2 shift valve 57 has its spool in the upper half position (shown in FIG. 4) at the 1st speed and in the lower half position at the 2nd to 4th speeds. The 2-3 shift valve 60 has its spool in the lower half position shown in FIG. 4 at the 1st and 2nd speeds and in the upper half position at the 3rd and 4th speeds. The 3-4 shift valve 62 has its spool in the upper half position shown in FIG. 4 at the 1st and 4th speeds and in the lower half position at the 2nd and 3rd speeds. The neutral relay valve 64 has its spool in the upper half position shown in FIG. 4 for neutral control and in the lower half position at the 1st to 4th speeds.

The solenoid modulator valve 58 is connected through an oil line L-12 to a linear solenoid valve 66, which is connected through an oil line L-13 to a C-1 control valve 67. The linear solenoid valve 66 is further connected through an oil line L-22 to the primary valve 59.

Moreover, the linear solenoid valve 66 is controlled by a control signal received from the automatic transmission control system 41, to feed a throttle pressure $P_{TH}$ as the control signal oil pressure through the oil line L-13 to the C-1 control valve 67. This C-1 control valve 67 receives the D-range pressure through the oil lines L-3 and L-14 and converts it to a control oil pressure (hereinafter "C-1 oil pressure") $P_{C1}$ of the hydraulic servo C-1, corresponding to the throttle pressure $P_{TH}$ coming from the linear solenoid valve 66, and feeds it to an oil line L-15.

The B-1 sequence valve 56 has a spring arranged at its left end in the drawing and a control oil chamber formed at its right end in the drawing. The spring applies a spring load to the spool. At 1st speed the B-1 sequence valve 56 takes the lower half position in response to the D-range pressure it receives at the control oil chamber through the oil line L-3. When increasing oil pressure is fed at 2nd speed to hydraulic servo B-2, the B-1 sequence valve 56 receives the sequence pressure from the hydraulic servo B-2 so that it takes its upper half position in response to the sequence pressure and the spring load on the spool.

As a result, the oil pressure from the 1-2 shift valve 57 is fed through the B-1 sequence valve 56 to the 3-4 shift valve 62 and further through the 1-2 shift valve 57 and the neutral relay valve 64 to the hydraulic servo B-1. Thus, the oil pressure is fed to the hydraulic servo B-1 in response to the rise of the oil pressure in the hydraulic servo B-2.

The neutral relay valve 64 takes its upper half position in the neutral control state. In this neutral control, therefore, the C-1 oil pressure $P_{C1}$, as established in the oil line L-15, is fed through an oil line L-16, the neutral relay valve 64 and an oil line L-17 to the hydraulic servo C-1. The oil at the C-1 oil pressure $P_{C1}$ is fed through oil lines L-23 and L-24 to a B-1 control valve 70.

At the 1st to 4th speeds, the neutral relay valve 64 takes its lower half position. At the 1st to 4th speeds, therefore, the oil at the D-range pressure is fed through the oil line L-3, the neutral relay valve 64 and the oil line L-17 to the hydraulic servo C-1. In the neutral control state, moreover, the neutral relay valve 64 is switched to its upper half position to connect the oil line L-16 and the oil line L-17.

A damper valve 68 is provided in the oil line L-17 for smoothing the release of the oil from the hydraulic servo C-1.

A hydraulic servo B-4 operates the fourth brake B4 (FIG. 3).

Figure 6:
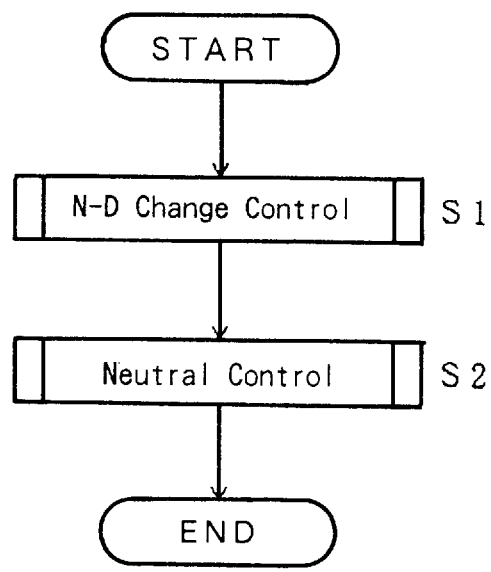
FIG. 6 is a flow chart of a main routine which may be utilized in operating the embodiment depicted in FIGS. 1 and 2.

Operations of the automatic transmission control system will now be described with reference to FIGS. 6–13. FIG. 6 illustrates the main control routine which is started when the ignition of the engine 10 (FIG. 2) is turned ON. The main control routine repeats the N-D change control and the neutral control until the ignition is turned OFF. Thus:

Step S1: The N-D change control is executed; and

Step S2: The neutral control is executed.

Figure 7:
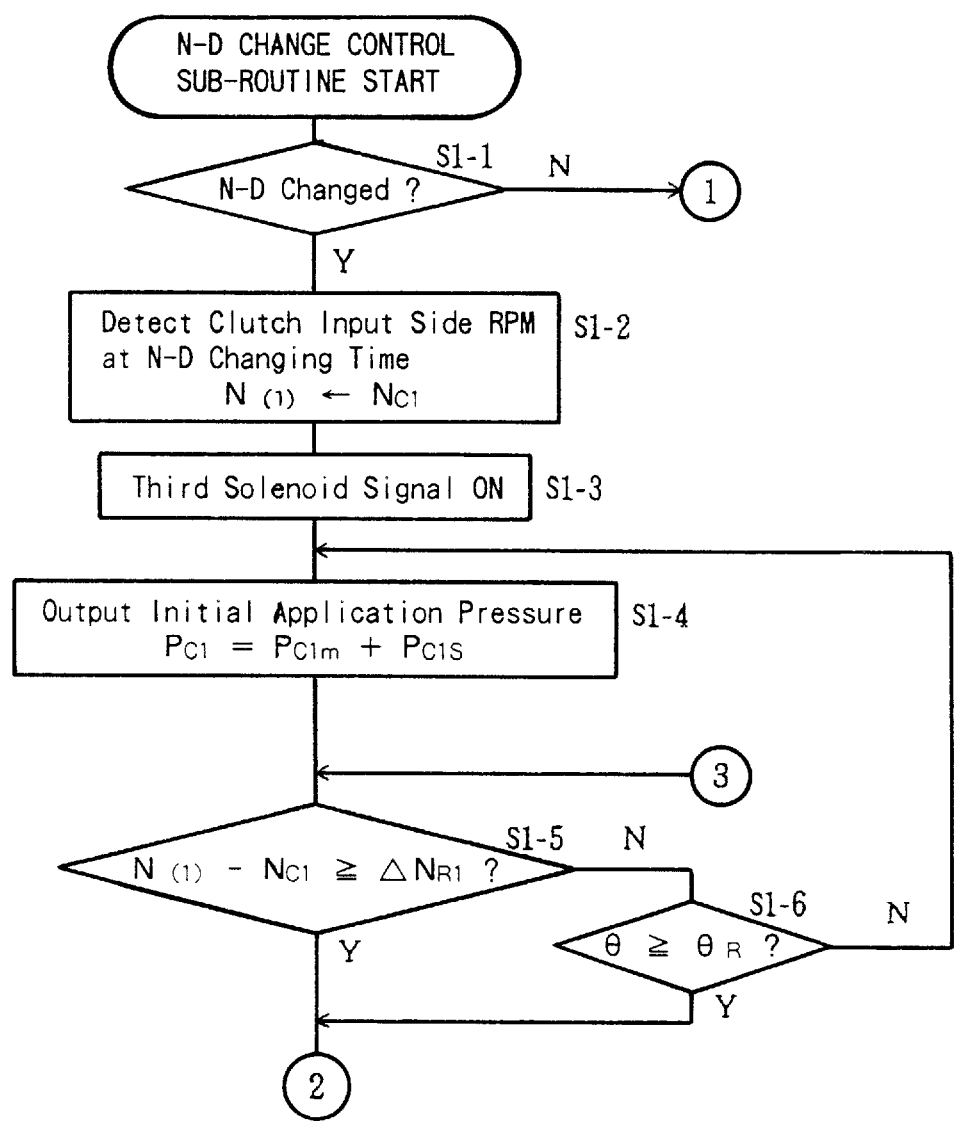
FIGS. 7 and 8 together show a flow chart for an N-D change control subroutine which is step S1 in the main routine of FIG. 6.
Figure 8:
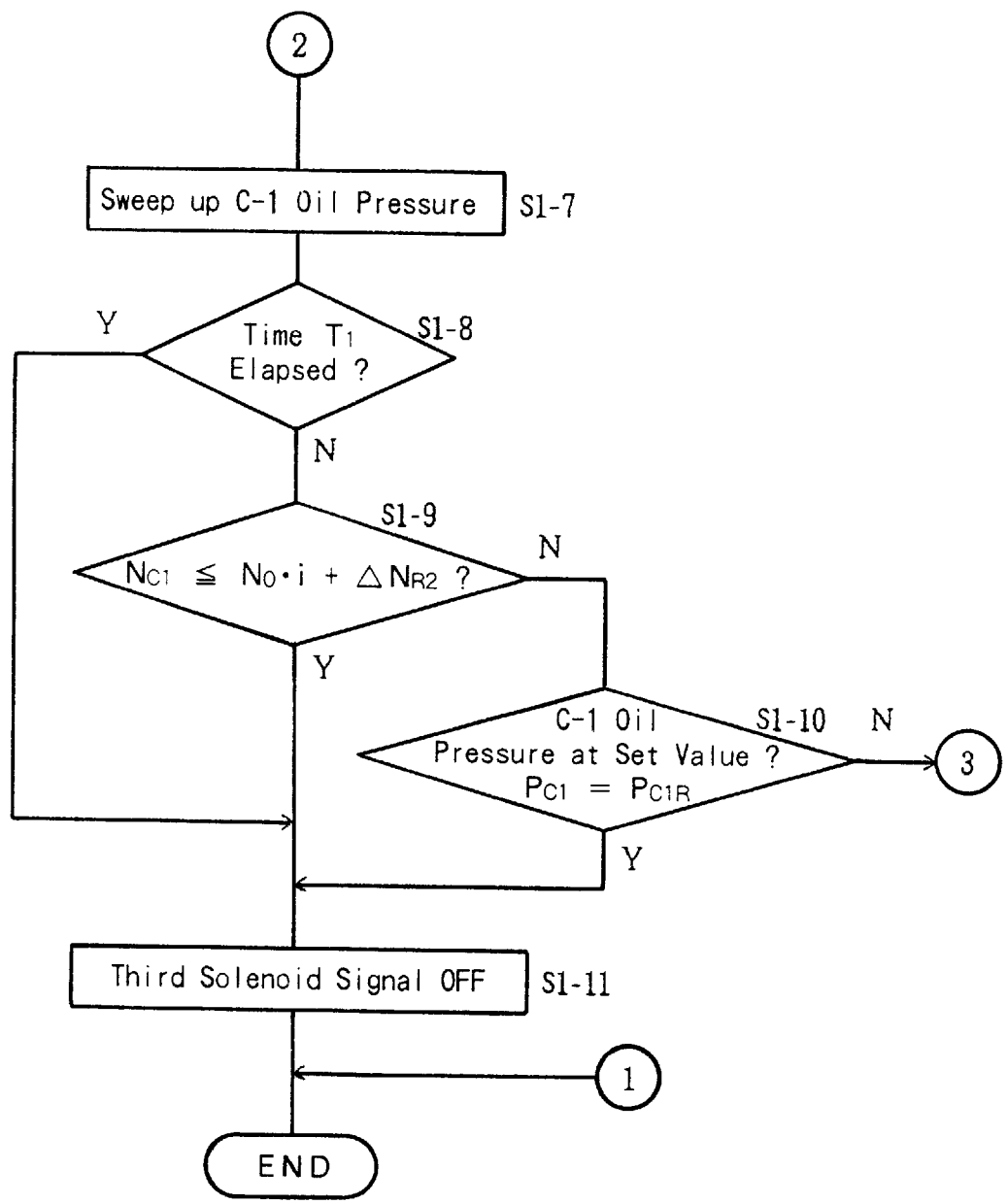
Figure 9:
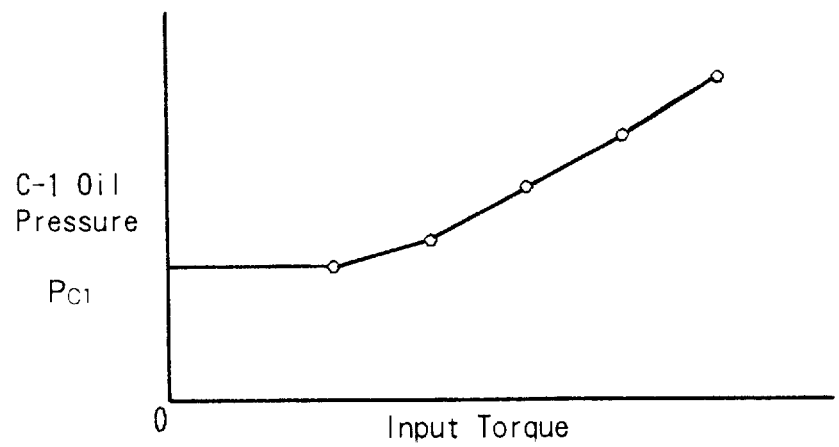
FIG. 9 is a graph of the relationship between input torque (abscissa) and C-1 oil pressure (ordinate) in the embodiment of FIGS. 1 and 2.
Figure 10:
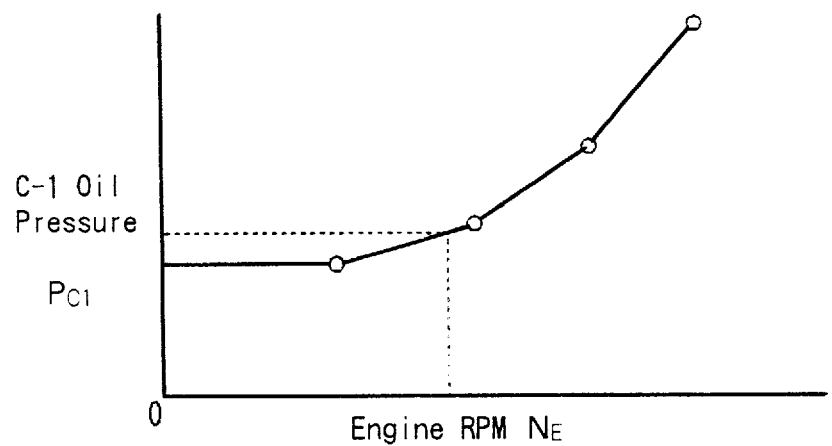
FIG. 10 is a graph of the relationship between engine RPM $N_E$ (abscissa) and the C-1 oil pressure (ordinate) in the embodiment of FIGS. 1 and 2.
Figure 11:
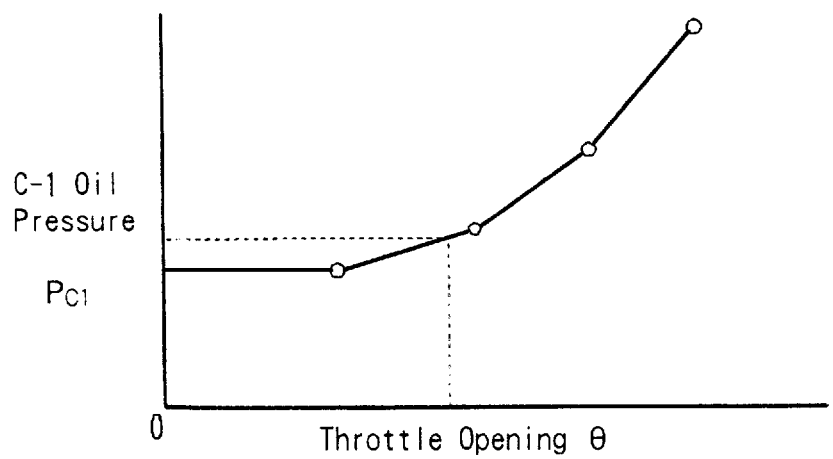
FIG. 11 is a graph of the relationship between throttle opening θ (abscissa) and the C-1 oil pressure (ordinate) in the embodiment of FIGS. 1 and 2.

The N-D change control subroutine for execution of step S1 is shown in FIG. 7. In this subroutine, when the driver performs the N-D change operation, an additional pressure $P_{C1S}$ is added to a reference C-1 oil pressure $P_{C1m}$, as last obtained in the neutral control of Step S2, so that the resultant C-1 oil pressure $P_{C1}$ is fed to the hydraulic servo C-1 (FIG. 5) to bring the first clutch C1 (FIG. 2) into a partially applied state. Subsequently, the C-1 oil pressure $P_{C1}$ is swept up to bring the first clutch C1 into a completely applied state.

Step S1-1: It is decided on the basis of the signal coming from the neutral start switch 45 whether or not a N-D change has been commanded by the driver. Simultaneously with this, the first timer is started. The routine advances to Step S1-2, if a N-D change has been performed, but the N-D change control is ended if the N-D change is commanded.

Step S1-2: The clutch input side RPM $N_{C1}$ at the time of a N-D change is detected and set as a value $N_{(1)}$.

Step S1-3: The third solenoid signal $S_3$ for opening/closing the third solenoid valve S3 is turned ON. This third solenoid signal $S_3$ is output from the automatic transmission control system 41.

Step S1-4: The application starting pressure detecting means 101 (FIG. 1) determines the C-1 oil pressure $P_{C1}$ to be fed at first to the hydraulic servo C-1 so as to bring the first clutch C1 into a partially applied state, and the initial application pressure setting means 104 sets the C-1 oil pressure $P_{C1}$ as the initial application pressure. In this operation, the application starting pressure detecting means 101 determines the C-1 oil pressure $P_{C1}$ corresponding to the input torque, by reference to the map of FIG. 9, in the case of N-D change control immediately after the ignition has been turned ON. On the other hand, the C-1 oil pressure $P_{C1}$ can also be determined by reference to the map of FIG. 11 if idling ON and to the map of FIG. 11 of idling OFF.

Figure 12:
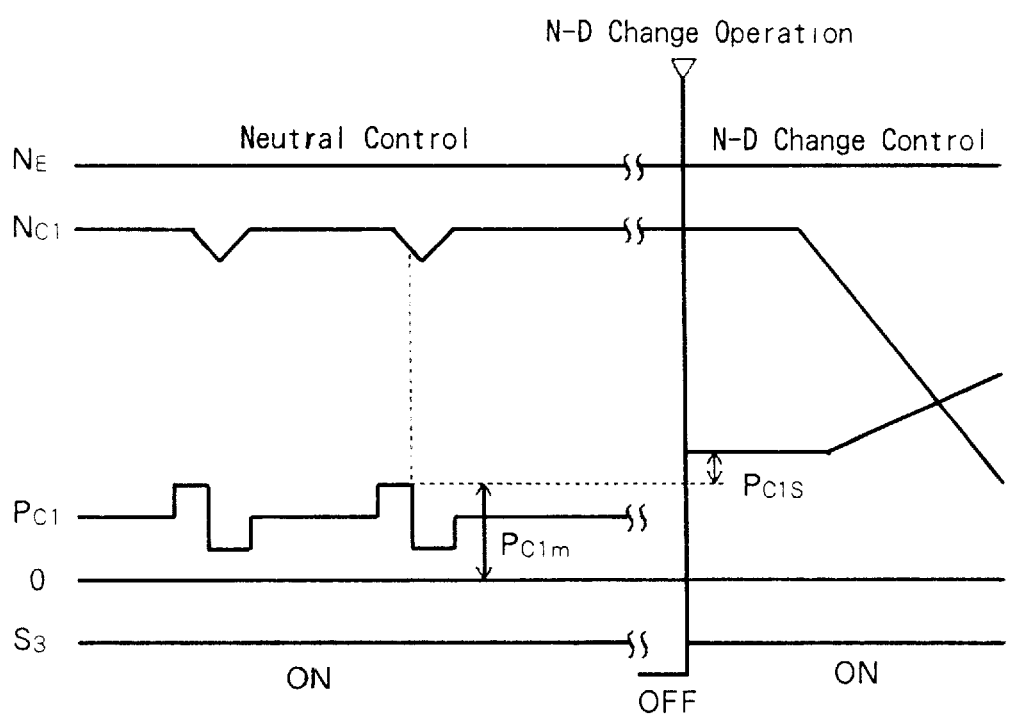
FIG. 12 is a time chart for the N-D change control subroutine of FIGS. 7 and 8.

On the other hand, in the case of the N-D change control after the neutral control of Step S2, that is, if the N-range is selected after execution of neutral control and is followed by the N-D change control, the application starting pressure detecting means 101 determines the C-1 oil pressure $P_{C1}$ by adding the additional pressure $P_{C1S}$ to the reference C-1 oil pressure $P_{C1m}$ which is obtained in the neutral control, as shown in FIG. 12, from the following formula:

$$P_{C1} = P_{C1m} + P_{C1S}.$$

In the aforementioned neutral control, the C-1 oil pressure $P_{C1}$ is repeatedly raised and lowered, as will be described hereinafter, but the C-1 oil pressure $P_{C1}$ before lowering is employed as the aforementioned reference C-1 oil pressure $P_{C1m}$.

Also in the neutral control, the C-1 oil pressure $P_{C1}$ before lowering is used as the reference C-1 oil pressure $P_{C1m}$ so that the reference C-1 oil pressure $P_{C1m}$ becomes the application starting pressure at the instant when the application of the first clutch C1 is actually started. As a result, the initial application pressure can be properly set for the actual oil pressure to be fed to the hydraulic servo C-1 which will vary somewhat in accordance with differences in the urging force of the return spring and in the hydraulic control system itself introduced during manufacture.

As a result, the first clutch C1 can always be stably applied without any delay. Even if the accelerator pedal (not shown) is depressed simultaneously with the N-D change, the first clutch C1 is prevented from being applied with racing of the engine 10. This makes it possible to avoid application shock.

Moreover, the first clutch C1 is not abruptly applied so that the application shock, as might otherwise be caused by the abrupt application of the first clutch C1, can be prevented.

The reference C-1 oil pressure $P_{C1m}$ obtained by the neutral control can be utilized as the application starting pressure so that application starting pressure detecting means 101 need not be provided for the N-D change control. As a result, the automatic transmission control system 41 can be simplified.

Basically, the reference C-1 oil pressure $P_{C1m}$ does not vary even with a change in the output torque of the engine 10 but becomes higher with increasing output torque after the application of the first clutch C1 has been started.

When the oil temperature drops, the viscous resistance of the oil increases and, at low temperatures, when the hydraulic control unit 40 outputs a signal to the linear solenoid valve 66 (FIG. 4) to establish a predetermined C-1 oil pressure $P_{C1}$, a large delay in establishing the C-1 oil pressure $P_{C1}$ may be seen.

Moreover, since the aforementioned C-1 oil pressure $P_{C1m}$ is static, it does not vary even if the oil temperature changes. However, the C-1 oil pressure $P_{C1}$ after the start of the application of the first clutch C1 will drop as the rise in the oil pressure is delayed due to a lower oil temperature, even if the hydraulic control unit 40 outputs a signal at the same level to the linear solenoid valve 66.

Figure 13:
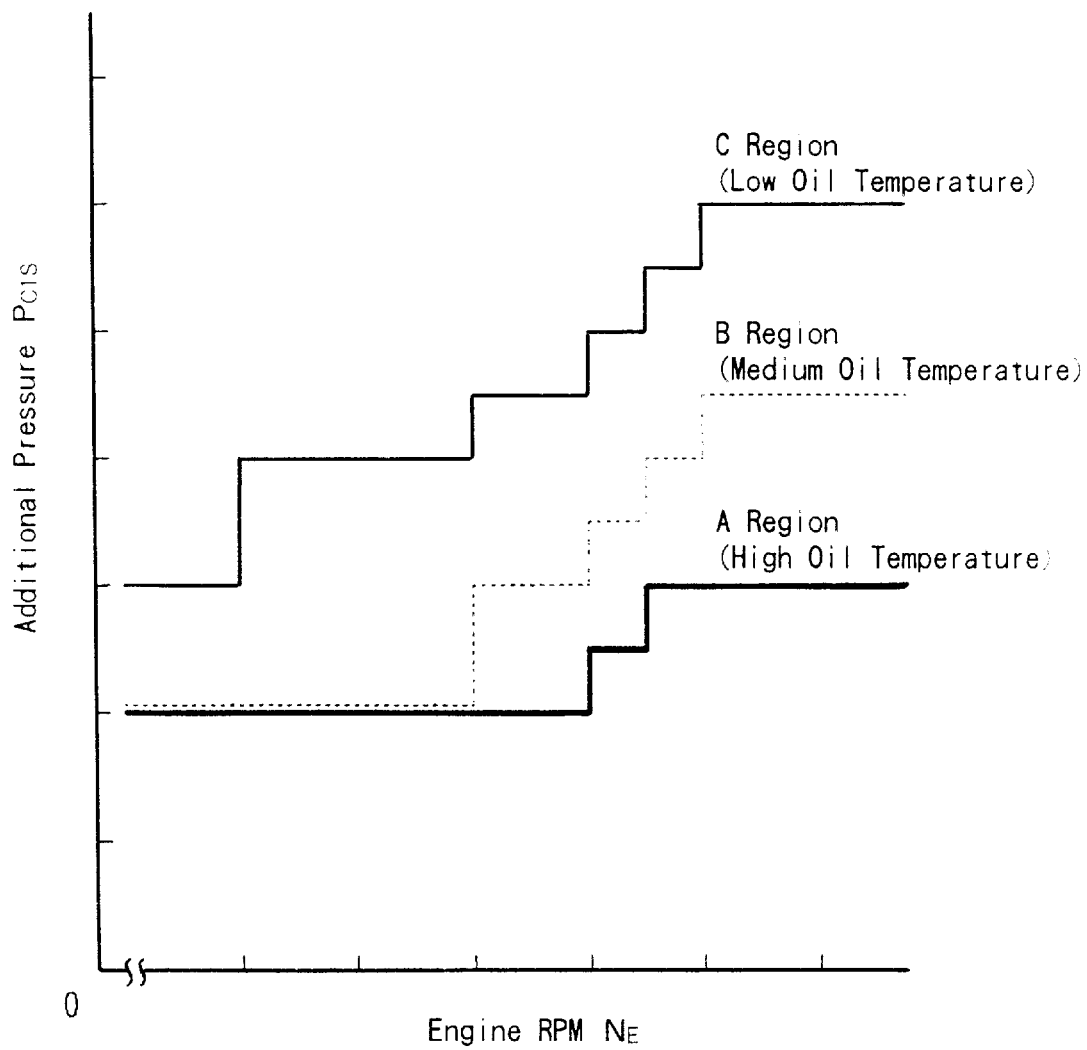
FIG. 13 is a graph of the relationship between the engine RPM $N_E$ (abscissa) and the pressure increment $P_{C1S}$ (ordinate) added to the reference C-1 oil pressure $P_{C1m}$ in the N-D change control subroutine of FIGS. 7 and 8 (step S1-4)

As illustrated in FIG. 13, the additional pressure $P_{C1S}$ is raised with higher output torque of the engine 10, i.e., the engine RPM $N_E$. Moreover, the additional pressure $P_{C1S}$ is changed responsive to a change in oil temperature in accordance with an A region for a high oil temperature, a B region for a medium oil temperature and a C region for a low oil temperature.

As a result, a stably applied state can be established with avoidance of both application delay and an abrupt application.

Step S1-5: The application detecting means of the automatic transmission control system 41 detects the clutch input side RPM $N_{C1}$ at this time and decides whether or not the difference ($N_{(1)} - N_{C1}$), calculated by subtracting the clutch input side RPM $N_{C1}$ from the value $N_{(1)}$, is over a set value $\Delta N_{R1}$. The routine advances to Step S1-7, if the value ($N_{(1)} - N_{C1}$) is over the set value $\Delta N_{R1}$, but to Step S1-6 if the value ($N_{(1)} - N_{C1}$) is below the set value $\Delta N_{R1}$.

Incidentally, even if the initial application pressure is set, a predetermined time period is required for the actual C-1 oil pressure $P_{C1}$ fed to the hydraulic servo C-1 to reach the initial set pressure. As a result, if the sweep-up is started immediately after the initial application pressure has been set, the C-1 oil pressure $P_{C1}$ is raised although the C-1 oil pressure $P_{C1}$ in the hydraulic servo C-1 has not actually reached the initial application pressure and the first clutch C1 is not at a predetermined applied state, so that the first clutch C1 is abruptly applied. As a result, application shock occurs.

Until the first clutch C1 starts its actual engagement, therefore, the aforementioned initial application pressure is held, and the C-1 oil pressure $P_{C1}$ is gradually raised after the actual start of engagement of the first clutch C1. As a result, the first clutch C1 is not abruptly applied so that application shock can be prevented.

Step S1-6: It is decided whether or not the throttle opening $\theta$ is over a set value $\theta_R$. The routine advances to Step S1-7, if the throttle opening $\theta$ is over the set value $\theta_R$, but returns to Step S1-4 if the throttle opening $\theta$ is below the set value $\theta_R$.

The aforementioned set value $\Delta N_{R1}$ is set to the value at the time when the piston of the hydraulic servo C-1 reaches the piston stroke end so that the first clutch C1 starts its engagement (or grip), and the aforementioned set value $\theta_R$ is set to a value indicating that the driver is starting the vehicle.

Thus, in the state in which the first clutch C1 has not yet started to engage, the routine advances to Step S1-7 if the accelerator pedal is depressed to increase the throttle opening $\theta$.

Step S1-7: The C-1-oil pressure $P_{C1}$ is swept up. This C-1 oil pressure $P_{C1}$ is raised by changing the control signal oil pressure coming from the linear solenoid valve 66. After this, the C-1 oil pressure $P_{C1}$ is raised by a set pressure $\Delta P$ at each lapse of a minute time $\Delta t1$, to continue the engagement of the first clutch C1.

Step S1-8: It is decided whether or not a time period $T_1$ clocked by the first timer has elapsed. The routine advances to Step S1-11, if the time period $T_1$ has elapsed, but to Step S1-9 if the time period $T_1$ has not elapsed.

Step S1-9: It is decided on the basis of the speed change unit output RPM $N_0$ whether or not the engagement of the first clutch C1 has ended. If, in this case, the gear ratio of the speed change unit 16 is designated "i," the RPM at the output side of the first clutch C1 is estimated to be $N_0 \cdot i$. Therefore, the completion of engagement is decided if the clutch input side RPM $N_{C1}$ is below the sum of the output side RPM $N_0 \cdot i$ and a set value $\Delta N_{R2}$, as expressed by:

$$N_{C1} \leq N_0 \cdot i + \Delta N_{R2}$$

Then, the routine advances to Step S1-11, if the application of the first clutch C1 is completed, but to Step S1-10 if the application of the first clutch C1 is not completed.

Step S1-10: It is decided whether or not the C-1 oil pressure $P_{C1}$ has reached a set value $P_{C1R}$. The routine advances to Step S1-11, if the C-1 oil pressure $P_{C1}$ has reached the set value $P_{C1R}$, but returns to Step S1-5 if the C-1 oil pressure $P_{C1}$ has not reached the set value $P_{C1R}$.

Step S1-11: The third solenoid Signal $S_3$ is turned OFF.

In this N-D change, the third solenoid signal $S_3$ for opening/closing the third solenoid valve $S_3$ is turned ON to feed the hydraulic servo C-1 with the C-1 oil pressure $P_{C1}$ which is set as the initial application pressure, so that the application of the first clutch C1 is started. As the clutch input side RPM $N_{C1}$ is decreased and as the throttle opening $\theta$ is increased by the driver depressing the accelerator pedal, the C-1 oil pressure $P_{C1}$ is gradually raised.

When the application of the first clutch C1 is thus ended, the third solenoid signal $S_3$ is turned OFF so that the vehicle is started.

Figure 14:
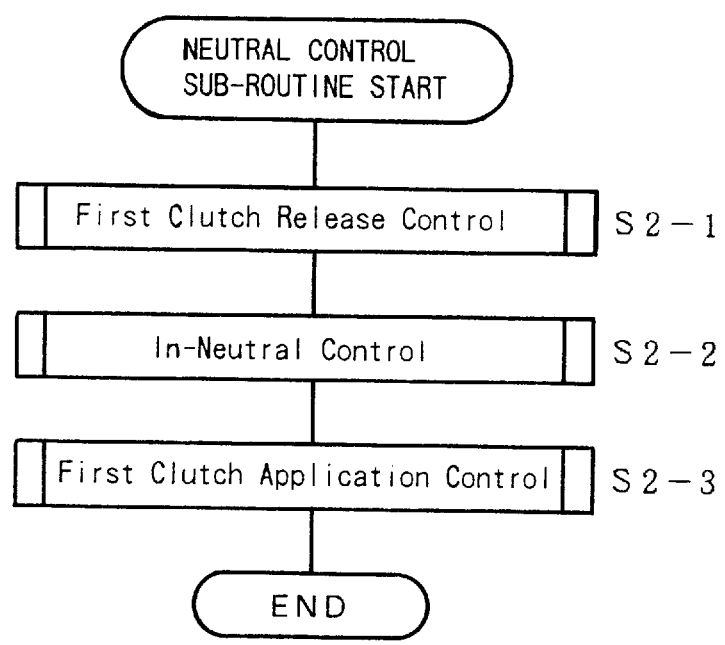
FIG. 14 is a flow chart of a neutral control subroutine, i.e. step S2 in FIG. 6.
Figure 15:
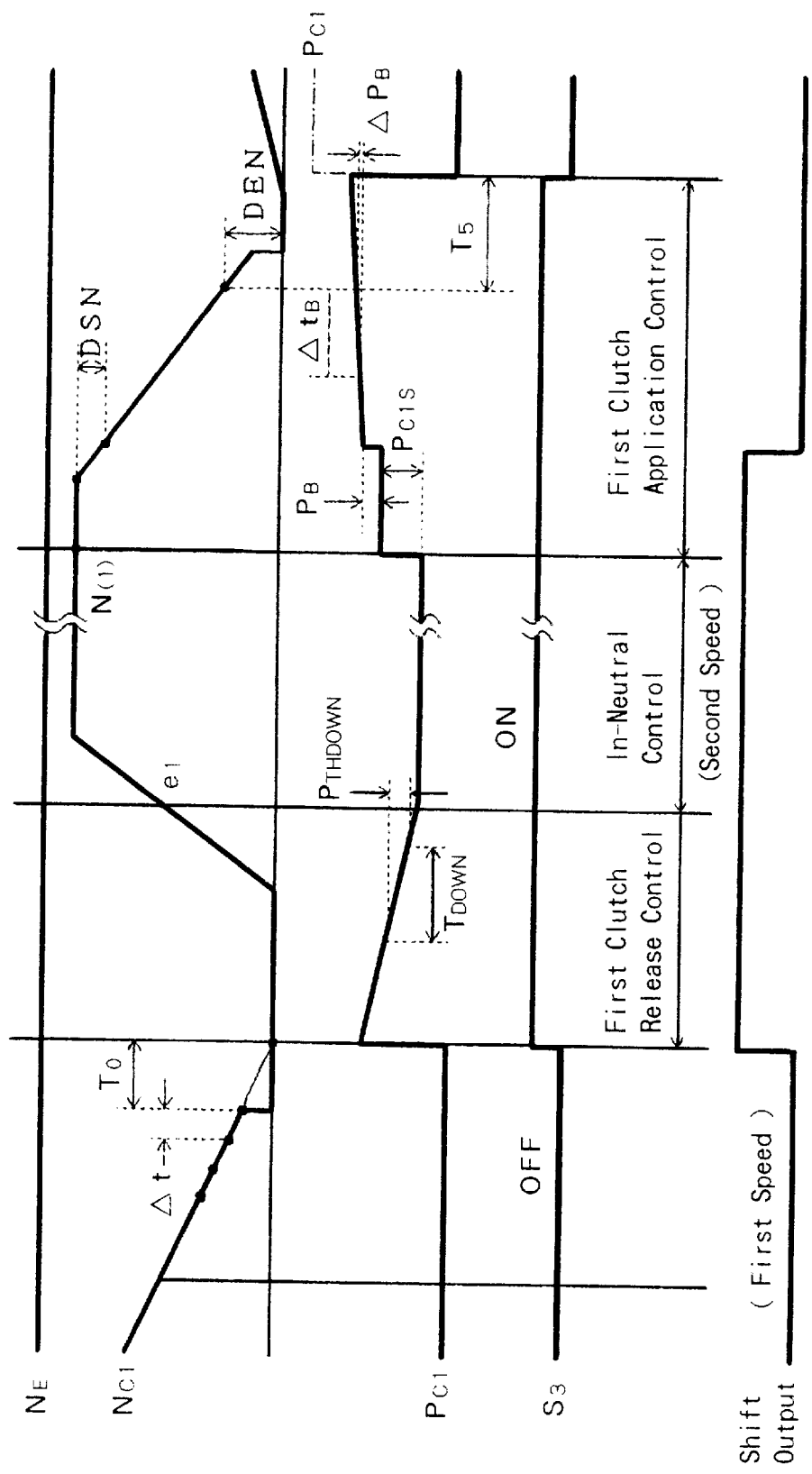
FIG. 15 is a time chart for the neutral control subroutine of FIG. 14.

The neutral control subroutine of Step S2 of FIG. 6 will now be described with reference to FIGS. 14 and 15.

Step S2-1: The release means in the automatic transmission control system 41 (FIG. 1) performs the first clutch release control. In this step, a zero vehicle speed is estimated to output the 2nd speed shift output at a set timing so that the applications of the second brake B2 (FIG. 2) and the first brake B1 are started to effect hill-hold control and thereby sweep down the C-1 oil pressure $P_{C1}$ at a set timing. The C-1 oil pressure $P_{C1}$ fed to the hydraulic servo C-1 is lowered to release the first clutch C1, until the retraction of the piston of the hydraulic servo C-1 is started. For this purpose, the engine RPM $N_E$ corresponding to the input torque is determined to output the C-1 oil pressure $P_{C1}$ corresponding to the engine RPM $N_E$, and the C-1 oil pressure $P_{C1}$ is gradually lowered.

Incidentally, the input torque can be detected not only from the engine RPM $N_E$ but also indirectly from the engine air suction or the fuel injection rate. Moreover, the input torque of the speed change unit 16 can also be directly detected by the torque sensor (not shown). In this latter case, the torque sensor is attached to the output shaft 14 of the torque converter 12.

Step S2-2: The specific release state holding means in the automatic transmission control system 41 performs in-neutral control to hold the first clutch C1 in the specific release state. At this step, stabilization of both the engine RPM $N_E$ and the clutch input side RPM $N_{C1}$ is awaited. After these stabilizations, the C-1 oil pressure $P_{C1}$ is raised or lowered by set pressures according to the engine RPM $N_E$ and the clutch input side RPM $N_{C1}$.

Step S2-3: A first clutch application control is executed. At this step, the C-1 oil pressure $P_{C1}$ is repeatedly raised by a pressure increment which is set on the basis of the throttle opening $\theta$ and the engine RPM $N_E$, to end the piston stroke of the hydraulic servo C-1 (FIG. 5). After the end of the piston stroke of the hydraulic servo C-1, the C-1 oil pressure $P_{C1}$ is repeatedly raised by a set pressure to prevent application shock.

Figure 16:
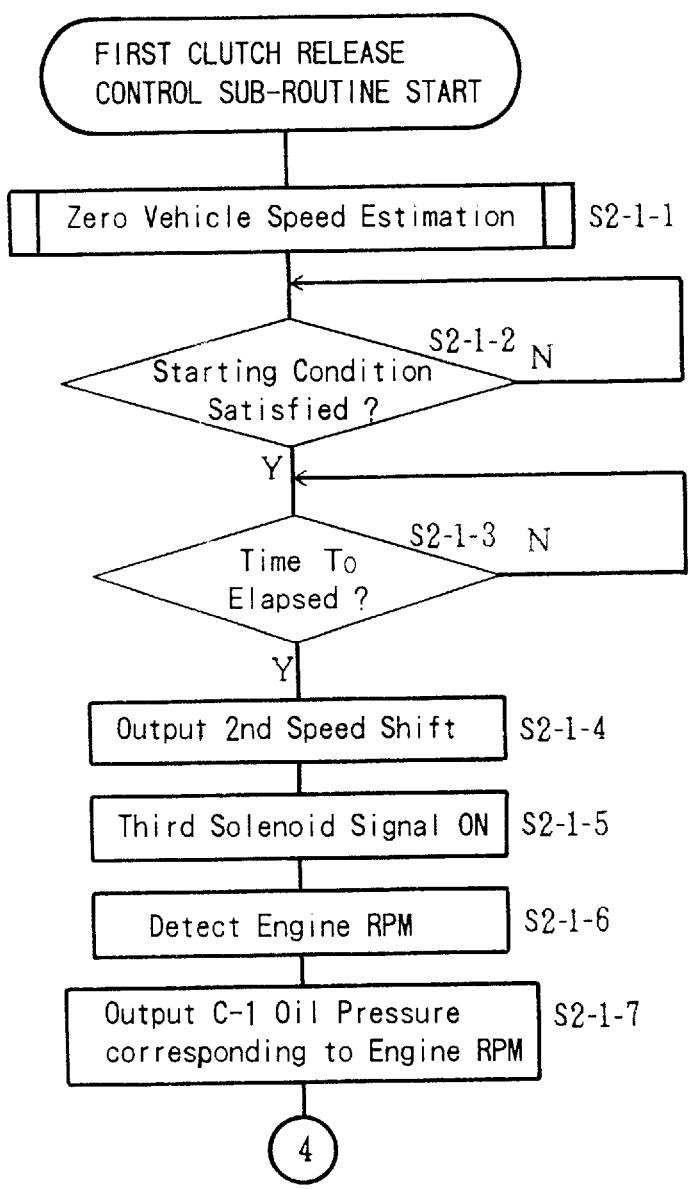
FIGS. 16 and 17 together show a flow chart for a first clutch release control subroutine, i.e. step S2-1 in FIG. 14.
Figure 17:
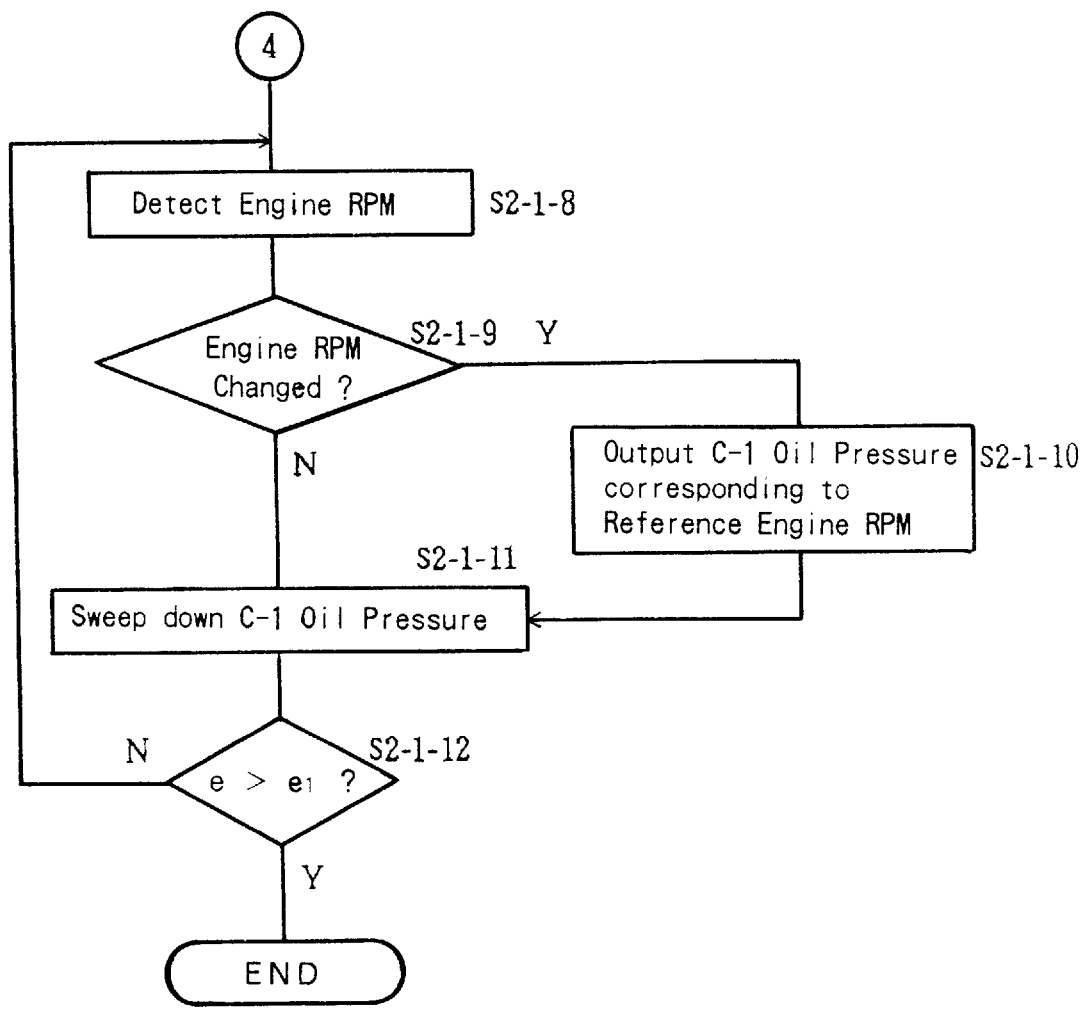
Figure 18:
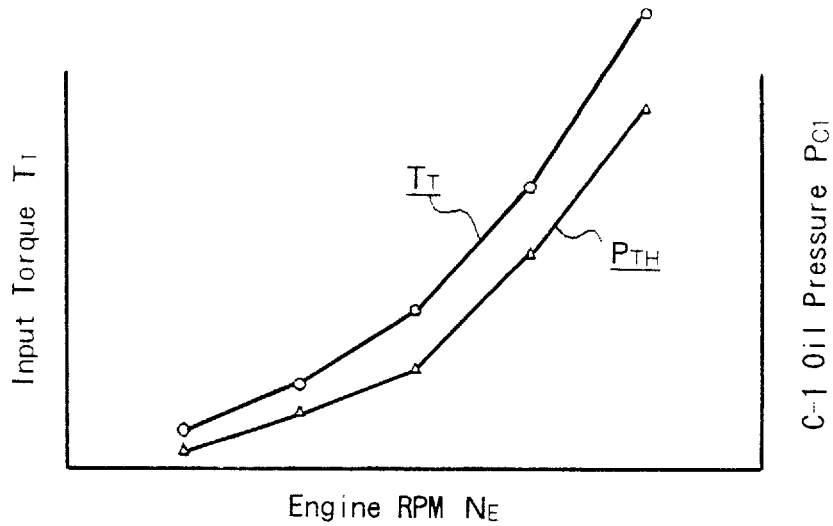
FIG. 18 is a graph of relationships between engine RPM $N_E$ (abscissa), and input torque $T_T$ (left ordinate) and throttle pressure $P_{C1}$ (right ordinate)

Next, the first clutch release control sub-routine at Step S2-1 of FIG. 14 will be described with reference to FIGS. 16 to 18.

Step S2-1-1: The zero vehicle speed is estimated on the basis of the detected variation in the clutch input side RPM $N_{C1}$.

Step S2-1-2: The stop state detecting means of the automatic transmission control system 41 (FIG. 2) awaits satisfaction of the starting conditions for neutral control. At the same time, the timing of the second timer (not shown) is started.

In this case, a "stop state" is decided if all the following individual conditions are satisfied: the clutch input side RPM Nc1 is substantially zero; the accelerator pedal (not shown) is released so that the throttle opening $\theta$ is less than a predetermined value; the oil temperature detected by the oil temperature sensor 46 is higher than a predetermined value; and the brake pedal (not shown) is depressed so that the brake switch 48 is ON. Incidentally, whether or not the clutch input side RPM $N_{C1}$ is substantially zero is decided depending upon whether or not the detection limit of the RPM sensor 47 is detected. In the present embodiment, the detection limit is a set (predetermined) value for the actual vehicle speed, e.g. 2 km/h.

Step S2-1-3: The lapse of a time period To timed by the second timer is awaited, and the sub-routine then advances to Step S2-1-4 if the time period To has elapsed. Here, the time period To is calculated in the zero vehicle speed estimation step, and the zero vehicle speed is estimated when the time period To has elapsed.

Step S2-1-4: the 2nd-speed shift output for starting the hill-hold control is generated, and the first solenoid signal $S_1$ for opening/closing the first solenoid valve S1 (FIG. 4) is turned ON to feed the oil pressure to the hydraulic servo B-2 to thereby apply the second brake B2. As the oil pressure in the hydraulic servo B-2 rises, the sequence pressure in the hydraulic servo B-2 is fed to the B-1 sequence valve 56 (FIG. 5) which, in turn, feeds the oil pressure to the hydraulic servo B-1 to thereby apply the first brake B1.

Thus, hill-hold control is executed to establish the 2nd-speed gear stage in the speed change unit 16 so that the first clutch C1, the first brake B1, the second brake B2 and the fourth brake B4 are applied to lock the one-way clutches F1 and F3. If the vehicle were to roll backward while facing uphill in this state, reverse rotation would be transmitted to the output shaft 23 of the auxiliary transmission 19 to rotate the ring gear $R_1$ forward. However, this forward rotation is blocked by the one-way clutch F2 so that the vehicle cannot roll backward.

Step S2-1-5: The third solenoid signal $S_3$ is turned ON to switch the neutral relay valve 64 to the upper half position to thereby bring the C-1 oil pressure $P_{C1}$ into a controllable state.

Step S2-1-6: As shown in FIG. 18, the engine RPM $N_E$ corresponding to the input torque $T_T$ is detected to set the value of the engine RPM $N_E$ to a reference engine RPM $N_{Em}$. Incidentally, in FIG. 18, the abscissa indicates the engine RPM $N_E$, and the ordinate indicates the input torque $T_T$ (=t·C·$N_E^2$) and the C-1 oil pressure $P_{C1}$.

Step S2-1-7: The C-1 oil pressure $P_{C1}$, immediately before the first clutch C1 is released in accordance with the engine RPM $N_E$, is established and output.

Step S2-1-8: The engine RPM $N_E$ corresponding to the input torque $T_T$ is again detected.

Step S2-1-9: The engine RPM $N_E$ is compared with the reference engine RPM $N_{Em}$ to decide whether or not it has changed. The sub-routine advances to Step S2-1-10, if the answer is YES, but to Step S2-1-11 if NOT.

Step S2-1-10: The value of the engine RPM $N_E$, when it is decided at Step S2-1-9 that the engine RPM $N_E$ has changed from the reference engine RPM $N_{Em}$, is set as a new reference engine RPM $N_{Em}$, and the C-1 oil pressure $P_{C1}$ corresponding to the new reference engine RPM $N_{Em}$ is established.

Step S2-1-11: The C-1 oil pressure $P_{C1}$ is lowered (or swept down) by a set pressure increment $P_{THDOWN}$ upon each lapse of a set time period $T_{DOWN}$ as expressed by the following formula:

$$P_{TH} = P_{Th} - P_{THDOWN}.$$

Step S2-1-12: After release of the first clutch C1, the pressure reduction of Step S2-1-11 is continued until a speed ratio e (=$N_{C1}/N_E$) exceeds a constant $e_1$. When the speed ratio e exceeds the constant $e_1$, the pressure reduction of Step S1-11 is stopped. The constant $e_1$ is set to 0.75, for example, by considering the delay of the change in the clutch input side RPM $N_{C1}$ in control of the oil pressure for releasing the first clutch C1. Incidentally, the speed ratio e may be substituted by the clutch input side RPM $N_{C1}$.

The applied state of the first clutch C1 is detected by deciding whether or not the difference (hereinafter "rotational difference") $\Delta N$ between the engine RPM $N_E$ or the RPM at the input side of the first clutch C1 and the clutch input side RPM $N_{C1}$ or the RPM at the output side has changed. The rotational difference $\Delta N$ does not change regardless of whether the first clutch C1 is completely applied or released. This makes it difficult to determine if the first clutch C1 is completely applied and if the first clutch C1 is released.

By waiting for the speed ratio to exceed the constant $e_1$, therefore, it is possible to reliably establish the state immediately before the application of the first clutch C1 is started.

Figure 19:
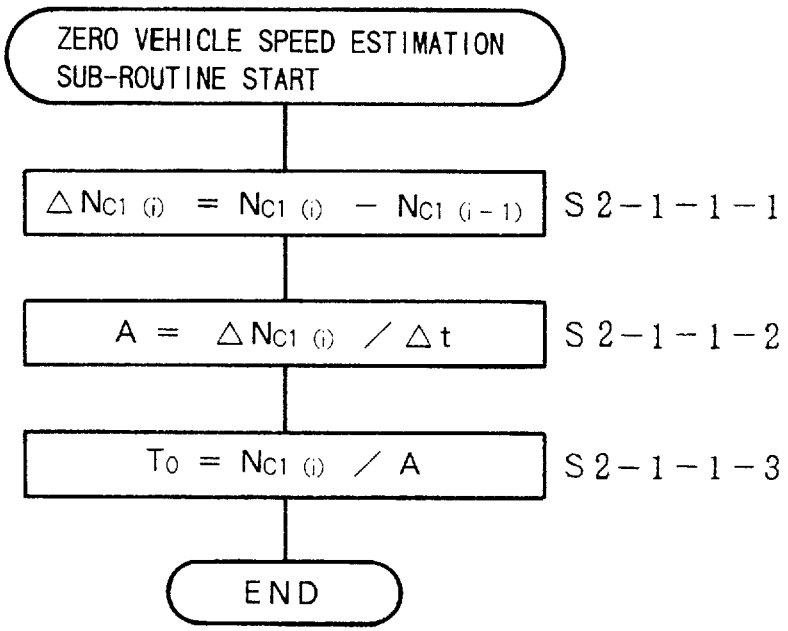
FIG. 19 is a flow chart of a zero vehicle speed estimation subroutine, i.e. step S2-1-1 in FIG. 16.

The sub-routine for zero vehicle speed estimation at Step S2-1-1 of FIG. 16 will now be described with reference to FIG. 19.

Step S2-1-1-1: An RPM difference $\Delta N_{C1(1)}$, is calculated by subtracting a clutch input side RPM $N_{C1(1-1)}$ at a time $\Delta t$ ago from the present clutch input side RPM $N_{C1(1)}$. In this case, the time period $\Delta t$ is set with the clock in the automatic transmission control system 41 (FIG. 2) so that the clutch input side RPM $N_{C1}$ is detected each time period $\Delta t$.

Step S2-1-1-2: Deceleration A of the vehicle is calculated by dividing the RPM difference $\Delta N_{C1(1)}$, by the time period $\Delta t$.

Step S2-1-1-3: The time period To for the vehicle to come to a halt (stop state) is calculated by dividing the present clutch input side RPM $N_{C1(1)}$ by the deceleration A.

Figure 20:
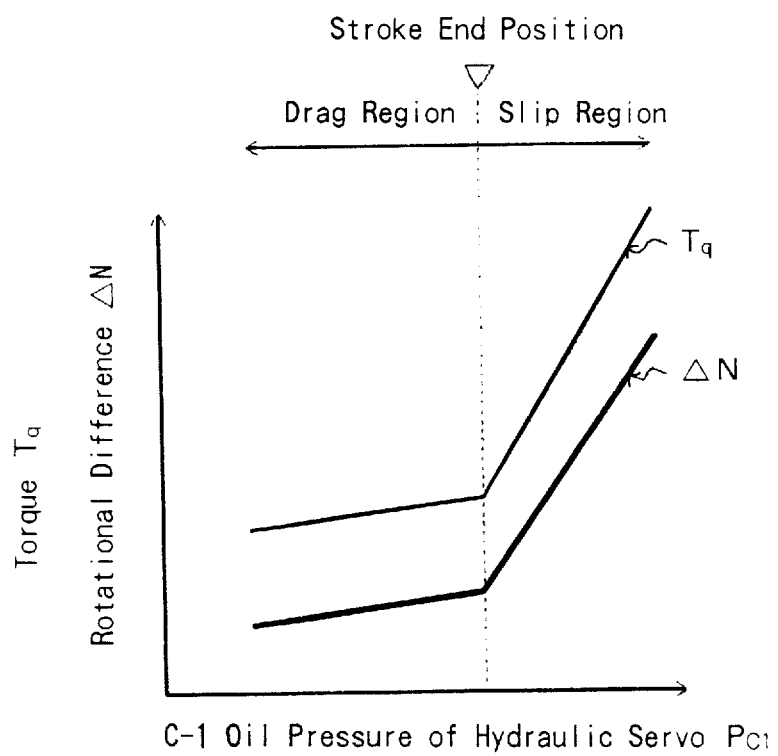
FIG. 20 is a graph of $P_{C1}$ (abscissa) versus torque Ta and rotational difference $\Delta N$ (ordinates), which illustrates the transition of clutch C-1 between drag and slip.
Figure 21:
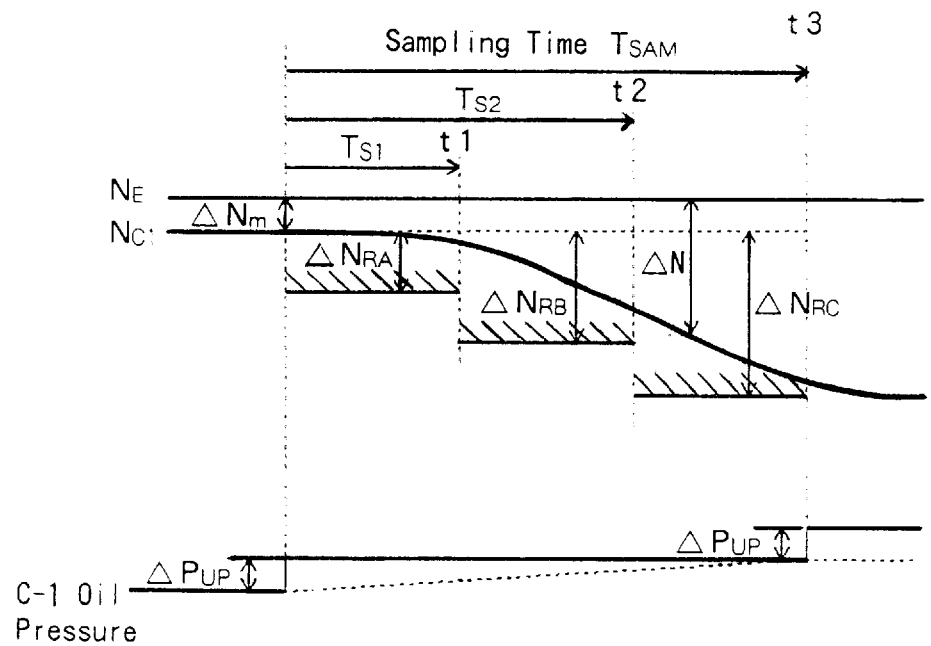
FIG. 21 is a time chart for operation of clutch C-1 in the drag region.
Figure 22:
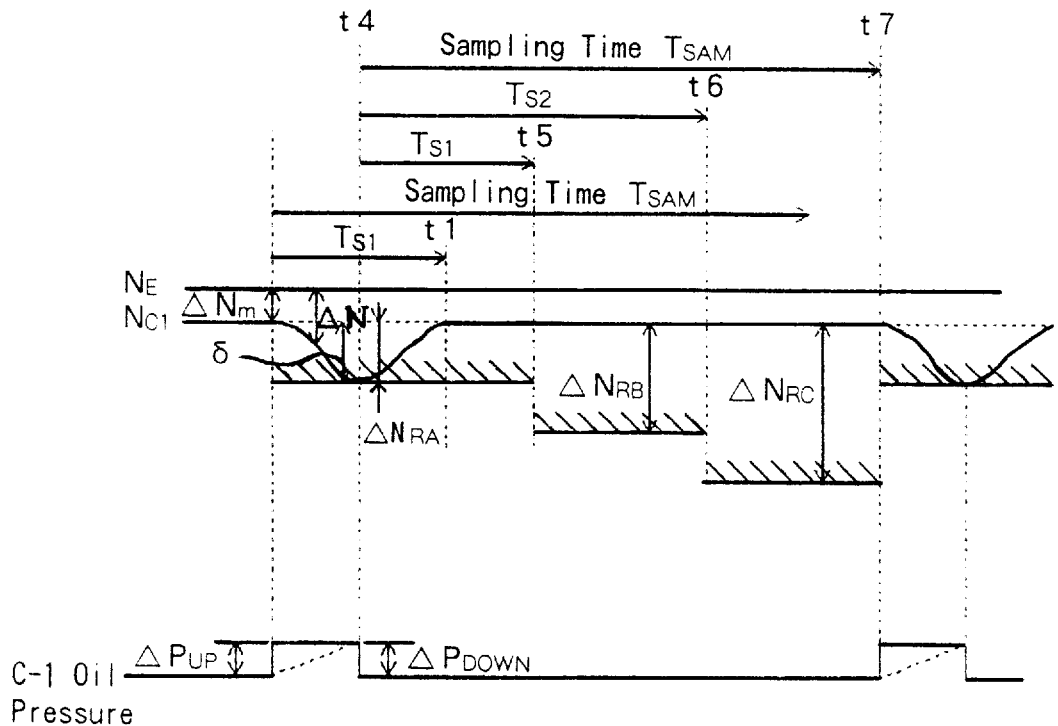
FIG. 22 is a time chart for operation of clutch C-1 in the slip region.

The relationships between the applied/released states of the first clutch C1 and the rotational difference $\Delta N$ are shown in FIGS. 20 to 22.

In FIG. 20, $T_q$ designates the torque to be transmitted from the engine 10 (FIG. 2) to the speed change unit 16 through the first clutch C1, and $\Delta N$ designates the rotational difference.

As shown in FIG. 20, as the C-1 oil pressure $P_{C1}$ is gradually raised, the torque $T_q$ increases so that a load is accordingly applied to the torque converter 12 to increase the rotational difference $\Delta N$.

Therefore, the rotational difference $\Delta N$ is determined by the calculation means in the aforementioned automatic transmission control system 41 so that the applied/released states of the first clutch C1, i.e., the torque transmission state, can be acquired by the rotational difference $\Delta N$.

When the application of the first clutch C1 is started from its completely released state by raising the C-1 oil pressure $P_{C1}$, the piston of the hydraulic servo C-1 eventually reaches a "stroke end position" where the stroke is completed. When the C-1 oil pressure $P_{C1}$ is further raised, the first clutch C1 comes into the completely applied state. Hence, the region between the completely released state of the first clutch C1 and the arrival of the piston at the stroke end position is referred to as the drag region (or inoperative region), whereas the region between the arrival of the piston at the stroke end position and the completely applied state of the first clutch C1 is referred to as the slip region (or operative position).

In the drag region, the individual friction elements of the first clutch C1 are not in contact with each other. However, some torque $T_q$ is transmitted more or less through the first clutch C1 by the viscosity characteristics of the oil existing between the individual friction elements. Moreover, the torque $T_q$ gradually increases, as the stroke of the piston increases, whereby the clearances (or gaps) between the friction elements decrease. In the drag region, too, the rotational difference $\Delta N$ rises according to the transmission of the torque $T_q$ and gradually increases as the torque $T_q$ increases.

In the slip region, on the other hand, the individual friction elements are in contact with each other so that frictional force abruptly increases the torque. Moreover, the piston has already reached the stroke end position so that the oil in the hydraulic servo C-1 abruptly quits raising the C-1 oil pressure. As a result, the frictional force is accordingly increased to further increase the torque $T_q$. As a result of the abrupt increase in the torque $T_q$, moreover, the rotational difference $\Delta N$ abruptly increases.

Here will be described the relation between the variation $\delta$ in the rotational difference $\Delta N$ according to the change in the applied/released states of the first clutch C1 and the rate of change $\rho$ of the rotational difference $\Delta N$ for the unit time period. If the rotational difference $\Delta N$ at the start of a sampling time $T_{sam}$ is assumed to be a reference rotational difference $\Delta N_m$, the variation $\delta$ can be expressed by the difference between the rotational difference $\Delta N$ and the reference rotational difference $\Delta N_m$ at an arbitrary time.

If the C-1 oil pressure $P_{C1}$ fed to the hydraulic servo C-1 is to be raised, the rotational difference $\Delta N$ changes gradually in the drag region but abruptly in the slip region, as described above. As a result, the variation $\delta$ in the rotational difference $\Delta N$ is small in the drag region but large in the slip region. Moreover, the rate of change $\rho$ of the rotational difference $\Delta N$ is also low in the drag region but high in the slip region.

Noting that the rate of change p is different in the drag region from that in the slip region, standard rates of change $\rho_1$ and $\rho_2$ in the drag region and in the slip region, for when the C-1 oil pressure $P_{C1}$ is raised, are determined to provide an intermediate value between the two rates of change $\rho_1$ and $\rho_2$, and this intermediate value is set as a reference rate of change $\rho_{REF}$. If this reference rate of change $\rho_{REF}$ is thus set, the rate of change $\rho$ while the first clutch C1 is in the drag region is always smaller than the reference rate of change $\rho_{REF}$, whereas the rate of change while the first clutch C1 is in the slip region is always larger than the reference rate of change $\rho_{REF}$.

By comparing the rate of change $\rho$ and the reference rate of change $\rho_{REF}$, therefore, it can be easily decided whether the first clutch C1 is in the drag region or in the slip region. Specifically, it can be decided, if the rate of change $\rho$ is lower than the reference value $\rho_{REF}$, that the first clutch C1 is in the drag region and, if the rate of change $\rho_{REF}$ is higher than the reference value $\rho_{REF}$, that the first clutch C1 is in the slip region. On the basis of this decision, moreover, it is possible to hold the state immediately before the first clutch C1 is transferred from the drag region to the slip region.

When the in-neutral control is started, the C-1 oil pressure $P_{C1}$ is lowered until at least that point in time when the piston of the hydraulic servo C-1 starts its retraction, so that the first clutch C1 is transferred from the slip region to the drag region.

Subsequently, the C-1 oil pressure $P_{C1}$ is so controlled that the rate of change $\rho$ of the rotational difference $\Delta N$ does not exceed the reference rate of change $\rho_{REF}$. Here in the present embodiment, when the rate of change $\rho$ and the reference rate of change $\rho_{REF}$ are to be compared, the comparison is not made directly between them but, rather, between the variation $\delta$ of the rotational difference $\Delta N$ for a set time period and the threshold value corresponding to the reference rate of change $\rho_{REF}$.

As shown in FIGS. 21 and 22, moreover, the aforementioned set time periods are exemplified not only by the sampling time $T_{sam}$ but also by the time periods $T_{S1}$ and $T_{S2}$ which are obtained by dividing the sampling time $T_{sam}$ by three. If, in this case, the time periods $T_{S1}$ and $T_{S2}$ and the sampling time $T_{sam}$, to elapse after the start of application of the first clutch C1, are designated by $t_1$ to $t_3$, respectively, the individual threshold values $\Delta N_{R1}$ (i=A, B and C) of the timings $t_1$ to $t_3$ are expressed, as follows:

$$\Delta_{RA} = \rho_{REF} \cdot T_{S1};$$

$$\Delta_{RB} = \rho_{REF} \cdot T_{S2};$$

and $$\Delta_{RC} = \rho REF \cdot T_{SM}.$$

Since the rate of change $\rho$ is low in the drag region, the threshold value $\Delta N_{R1}$ is not exceeded at the individual times $t_1$ to $t_3$, as seen from FIG. 21, even if the variation $\delta$ of the rotational difference $\Delta N$ increases as the time elapses. Therefore, the booster means 107 (FIG. 1) raises the C-1 oil pressure $P_{C1}$ by set pressures $\Delta P_{UP}$, as the sampling time period $T_{sam}$ elapses, to transfer the applied/released states of the first clutch C1 to the slip region side. Thus, the piston of the hydraulic servo C-1 is brought closer to the stroke end position with each lapse of the sampling time $T_{sam}$.

When the piston reaches the stroke end position so that the first clutch C1 transfers to the slip region, the rate of change $\rho$ of the rotational difference $\Delta N$ exceeds the reference rate of change $\rho_{REF}$.

As shown in FIG. 22, for example, after the start of the application of the first clutch C1, the variation $\delta$ of the rotational difference $\Delta N$ exceeds a threshold value $N_{RA}$ at a time t4 prior to lapse of the time period $T_{S1}$. Therefore, the first pressure reducing means 108 decides that the first clutch C1 has transferred from the drag region to the slip region at the time t4, i.e., at the instant when it is decided by the control program of the automatic transmission control system 41 that the variation $\delta$ has exceeded the threshold value $N_{RA}$, and lowers the C-1 oil pressure $P_{C1}$ by set pressure increments $\Delta P_{DOWN}$. At time t4, the sampling time $T_{sam}$ is reset. If, in this case, the times of lapses of the time periods $T_{S1}$ and $T_{S2}$ and the sampling time period $T_{sam}$, beginning at time t4, are respectively designated as t5 to t7, the threshold value $\Delta N_{R1}$ is reset at each of the times t5 to t7.

Thus, in the in-neutral control, the C-1 oil pressure $P_{C1}$ is lowered when the first clutch C1 transfers from the drag region to the slip region and the first clutch C1 is always held in a specific release state, i.e., in the state immediately before it transfers from the drag region to the slip region.

Since the individual friction elements of the first clutch C1 hardly contact each other, the torque to be transmitted from the engine 10 to the speed change unit 16 is extremely reduced, thereby not only improving the fuel economy but also eliminating any idle vibration in the vehicle.

Moreover, the individual friction elements of the first clutch C1 are saved from heating which would deteriorate their durability.

Moreover, since the piston of the hydraulic servo C-1 is held immediately ahead of the stroke end position, the lost stroke of the piston can be reduced. This makes it possible to prevent any delay in the application, as might otherwise be caused by the lost stroke, to thereby prevent racing of the engine 10 and application shock.

In the aforementioned drag region, the variation $\delta$ of the rotational difference $\Delta N$ does not exceed the threshold value $\Delta N_{R1}$ so that the booster means 107 raises the C-1 oil pressure $P_{C1}$ by the set pressure $\Delta P_{UP}$ each lapse of the sampling time $T_{sam}$, to transfer the applied/released states of the first clutch C1 to the side of the slip region. However, the rise of the actual C-1 oil pressure $P_{C1}$ in the hydraulic servo C-1 is delayed by the viscous resistance or the like of the oil when the C-1 oil-pressure $P_{C1}$ is raised by the set pressure $\Delta P_{UP}$.

In making the decision, the variation $\delta$ may not actually exceed the threshold value $\Delta N_{R1}$, if a delay is left in the rise of the C-1 oil pressure $P_{C1}$ at the instant of lapse of the sampling time $T_{sam}$ after the C-1 oil pressure $P_{C1}$ has been raised by the set pressure $\Delta P_{UP}$. Since, in this case, the C-1 oil pressure $P_{C1}$ is raised more prematurely than necessary by the set pressure $\Delta P_{UP}$, the delays in the rise of the C-1 oil pressure $P_{C1}$ are accumulated to cause overshooting upon transfer from the drag region to the slip region.

Moreover, if the sampling time $T_{sam}$ is longer than necessary, the piston is accordingly retracted.

Therefore, this sampling time $T_{sam}$ is so set to correspond to the time period necessary for completion of the actual change in the C-1 oil pressure $P_{C1}$ when the C-1 oil pressure $P_{C1}$ is raised by the set pressure $\Delta P_{UP}$, so that the C-1 oil pressure $P_{C1}$ may be raised at the proper instants in time.

Thus, the C-1 oil pressure $P_{C1}$ in the hydraulic servo C-1 is raised by the set pressure $\Delta P_{UP}$ after the delay in its rise has been eliminated. As a result, no accumulation of delays results and overshooting at the time when the first clutch C1 transfers from the drag region to the slip region is avoided. Moreover, the piston of the hydraulic servo C-1 can be prevented from retracting more than necessary.

Figure 23:
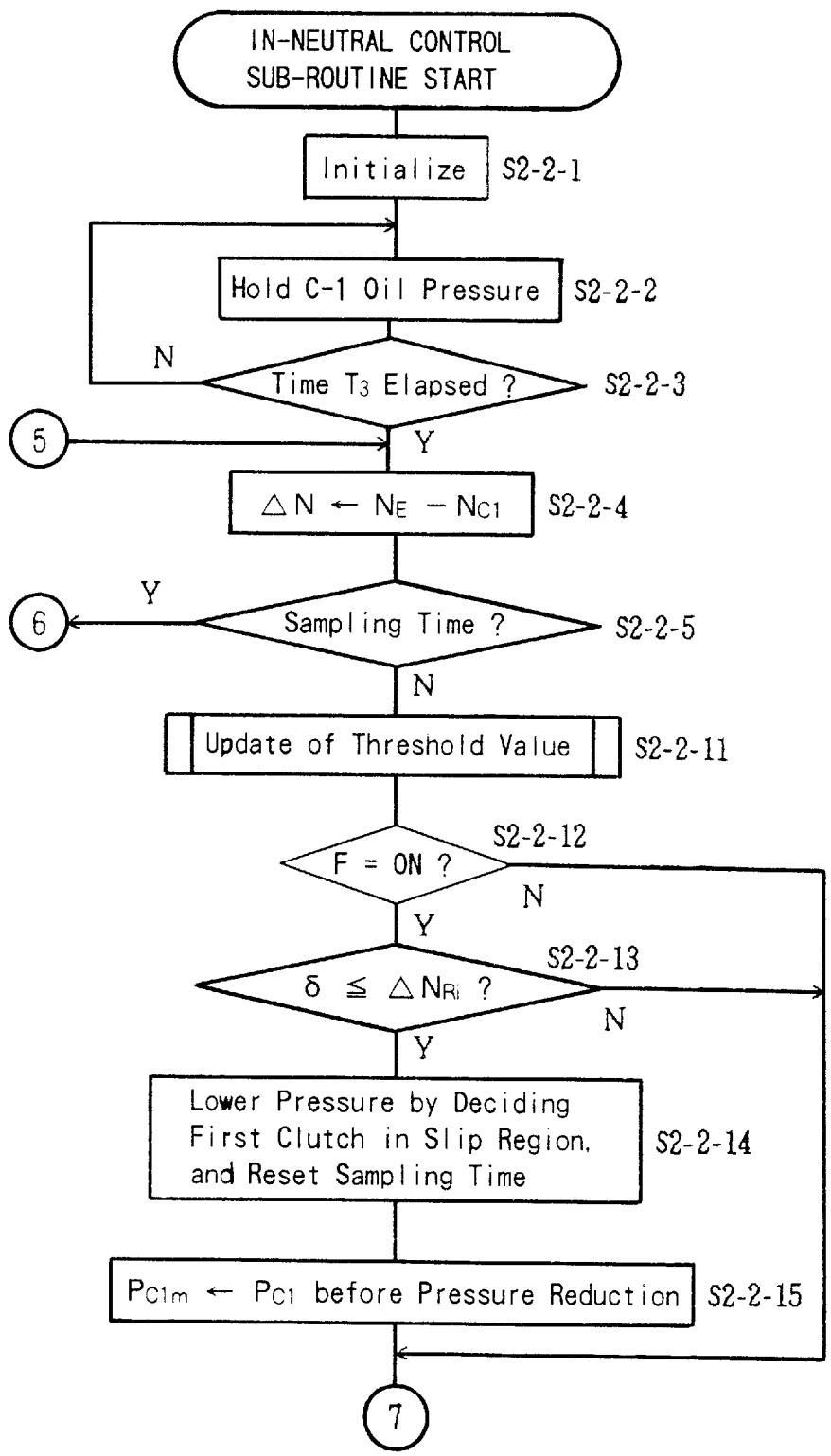
FIGS. 23 and 24 together show a flow chart of an in-neutral control subroutine, i.e. step S2-2 in FIG. 14.
Figure 24:
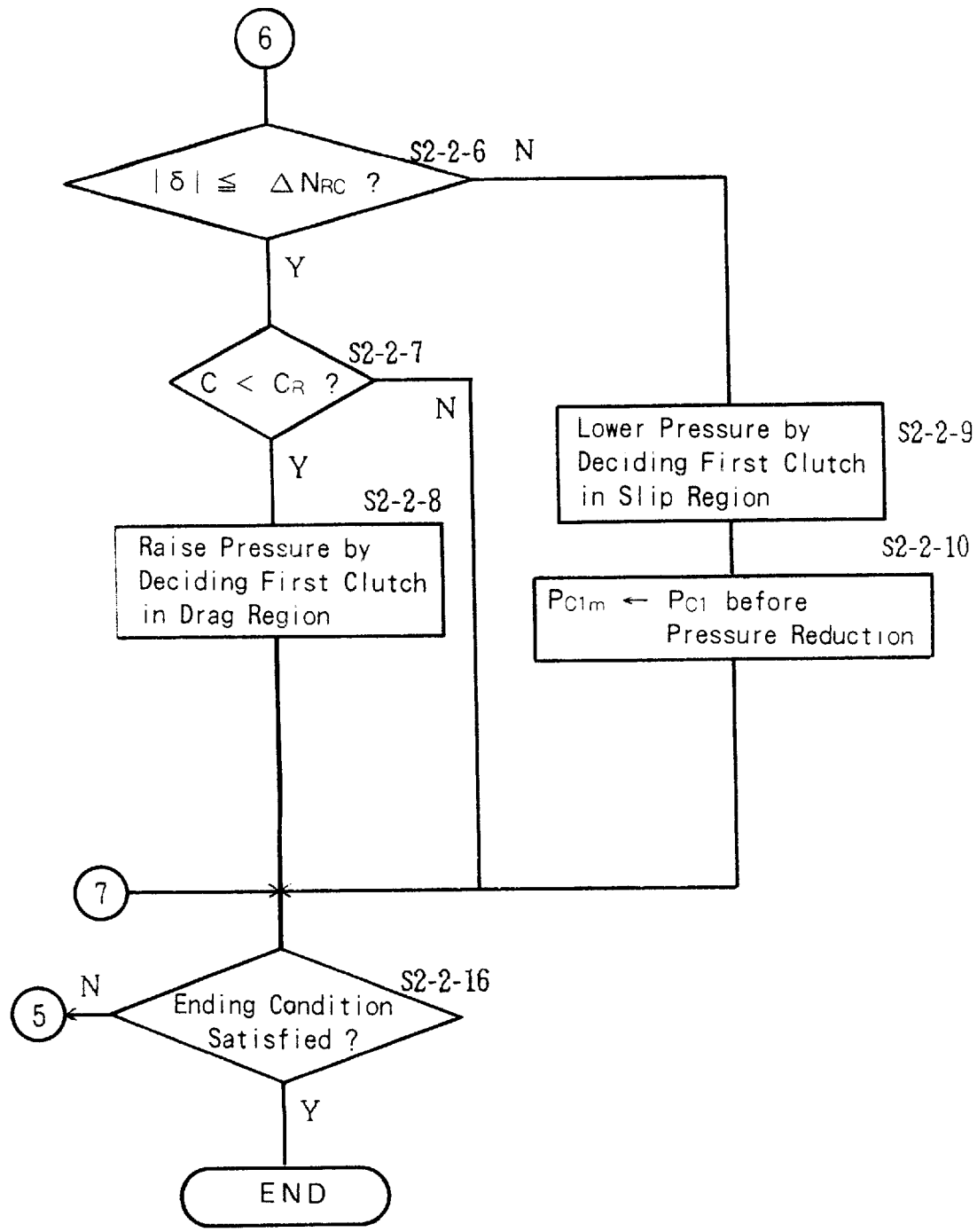

Next, the in-neutral control sub-routine of Step S2 of FIG. 14 will be described with reference to the flow chart of FIGS. 23 and 24.

Step S2-2-1: The initial values of an oil pressure control flag F, a value C of a counter (not shown) and the reference rotational difference $\Delta N_m$ are set, as follows:

F←OFF;

C←O;

and $\Delta N_m$←the value of the rotational difference $\Delta N$ (=$N_E$-$N_{C1}$) at this time.

Steps S2-2-2 and S2-2-3: The C-1 oil pressure $P_{C1}$ is held at the final value reached in the first clutch releasing control routine. If the decision of whether or not the rotational difference $\Delta N$ has changed is started immediately after it has been confirmed that the first clutch C1 is released to the predetermined state, an erroneous decision may be made due to that change in the rotational difference $\Delta N$ caused by the pressure reduction in the first clutch release control routine. Therefore, lapse of a time period $T_3$ determined by a second timer is awaited, during which time period the C-1 oil pressure $P_{C1}$ is held. As a result, the decision on whether or not the rotational difference $\Delta N$ has changed is delayed so that no attempt is made to control the C-1 oil pressure $P_{C1}$ while in an unstable (transition) state immediately after the first clutch C1 has been released. The routine advances to Step S2-2-4 if the time period $T_3$ has elapsed.

Step S2-2-4: The rotational difference $\Delta N$ between the engine RPM $N_E$ and the clutch input side RPM $N_{C1}$ is calculated.

Step S2-2-5: It is decided whether or not the predetermined time $T_{sam}$, e.g. 1.0 secs or 0.5 secs, has elapsed. The routine advances to Step S2-2-6, if the sampling time $T_{sam}$ has elapsed, but to Step S2-2-11 if the sampling time $T_{sam}$ has not elapsed.

Step S2-2-6: It is decided whether or not the difference between the rotational difference $\Delta N$ and the reference rotational difference $\Delta N_m$, i.e., the absolute value of the variation $\delta$, is below a threshold value $\Delta N_{RC}$. The routine advances to Step S2-2-7, if the absolute value of the variation $\delta$ is below the threshold value $\Delta N_{RC}$, but to Step S2-2-9 if the absolute value of the variation $\delta$ is over the threshold value $\Delta N_{RC}$.

Step S2-2-7: It is decided whether or not the value C counted by the counter is below a set value $C_R$. The routine advances to Step S2-2-8, if below the set value $C_R$, but to Step S2-2-16 if over the set value $C_R$.

Step S2-2-8: Since the absolute value of the variation $\delta$ is below the threshold value $\Delta N_{RC}$ even after the sampling time $T_{sam}$ has elapsed, the first clutch C1 is in the drag region. Hence, the booster means in the automatic transmission control system 41 boosts the C-1 oil pressure $P_{C1}$ by the set pressure $\Delta P_{UP}$ at the instant when the sampling time $T_{sam}$ elapses:

$P_{C1}$←$P_{C1}$+$\Delta P_{UP}$

Moreover, the rotational difference $\Delta N$ is set to the reference rotational difference $\Delta N_m$, and the oil pressure control flag F is turned ON:

$\Delta N_m$←$\Delta N$;

and

F←ON.

Step S2-2-9: It is decided that the first clutch C1 is transferring from the drag region to the slip region. Second pressure reducing means in the automatic transmission control system 41 lowers the C1 oil pressure $P_{C1}$ by the set pressure $\Delta P_{DOWN}$ at the instant the sampling time $T_{sam}$ elapses:

$P_{C1}$←$P_{C1}$-$\Delta P_{DOWN}$.

Moreover, the rotational difference $\Delta N$ is set to the reference rotational difference $\Delta N_m$, and the oil pressure control flag F is turned OFF. At the same time, the value "1" is subtracted from the counted value C of the counter:

$\Delta N_m$←$\Delta N$;

F←OFF;

and

C←C-1 (C=O for C<O).

If it is decided at Step S1-12 of the first clutch release routine that the speed ratio e exceeds the constant $e_1$, it is confirmed that the first clutch C1 is released to some extent. As a result, the first clutch release routine is ended, but the first clutch C1 is not released to the extent that the piston of the hydraulic servo C-1 will start its retraction. This makes it necessary to lower the C-1 oil pressure $P_{C1}$ so much that the first clutch C1 may transfer from the slip region to the drag region. Thus, the operation of Step S2-2-9 is repeated until the first clutch C1 transfers from the slip region to the drag region.

Once the first clutch C1 has transferred from the slip region to the drag region, it is held in the state assumed immediately before the transfer from the drag region to the slip region, so that the operation of Step S2-2-9 is not executed.

When the variation $\delta$ increases over the threshold value $\Delta N_{RC}$, the first clutch C1 can be released, provided the piston of the hydraulic servo C-1 actually starts its retraction, by repeating the operation of lowering the C-1 oil pressure $P_{C1}$ by the set pressure $\Delta P_{DOWN}$.

Step S2-2-10: The C-1 oil pressure $P_{C1}$ before the pressure reduction at Step S2-2-9 is set as a reference C-1 oil pressure $P_{C1m}$ and is stored in a memory:

$P_{C1m}$←$P_{C1}$ before the pressure reduction.

Step S2-2-11: The threshold value $\Delta N_{R1}$ is updated.

Step S2-2-12: It is decided whether or not the oil pressure control flag F is ON, that is, whether or not the C-1 oil pressure $P_{C1}$ is raised at the instant of elapse of the previous sampling time $T_{sam}$. The routine advances to Step S2-2-13, if the oil pressure control flag F is ON, but to Step S2-2-16 if the oil pressure control flag F is OFF.

Step S2-2-13: Since the C-1 oil pressure $P_{C1}$ is raised by the set pressure $\Delta P_{UP}$ (because the oil pressure control flag F is ON) at the instant of lapse of the previous sampling time $T_{sam}$, it is decided whether or not the variation $\delta$ or the remainder obtained by subtracting the rotational difference $\Delta N$ from the reference rotational difference $\Delta N_m$ is below the threshold value $\Delta N_{R1}$. The routine advances to Step S2-2-14, if the variation $\delta$ is below the threshold value $\Delta N_{R1}$, but to Step S2-2-16 if the variation $\delta$ is over the threshold value $\Delta N_{R1}$.

Step S2-2-14: As a result of the C-1 oil pressure $P_{C1}$ having been raised by the set pressure $\Delta P_{UP}$ at the instant of lapse of the previous sampling time $T_{sam}$, the rotational difference $\Delta N$ is greatly changed. Therefore, the first pressure reducing means in the automatic transmission control system 41 decides that the first clutch C1 has transferred from the drag region to the slip region, and lowers the C-1 oil pressure $P_{C1}$ by the set pressure $\Delta P_{DOWN}$ at the instant of Step S2-2-16:

$P_{C1}$←$P_{C1}$-$P_{DOWN}$.

Moreover, the sampling time $T_{sam}$ is reset, and the oil pressure control flag F is turned OFF. At the same time, the value "1" is added to the counted value C of the counter:

$\Delta N_m \leftarrow \Delta N$;

$F \leftarrow OFF$;

and $C \leftarrow C+1$.

If, at this time, the C-1 oil pressure $P_{C1}$ is lowered by the set pressure $\Delta P_{DOWN}$, the first clutch C1 takes the state immediately before the transfer form the drag region to the slip region. It is, therefore, desired that the C-1 oil pressure $P_{C1}$ is raised again by the set pressure $\Delta P_{UP}$ at the instant when the varied C-1 oil pressure $P_{C1}$ is stabilized by lowering it by the set pressure $\Delta P_{DOWN}$. Therefore, it is detected that the C-1 oil pressure $P_{C1}$ has been lowered by the set pressure $\Delta P_{DOWN}$, and at the instant of this detection, the sampling time $T_{sam}$ is reset to again start the timing.

Thus, the C-1 oil pressure $P_{C1}$ is raised early by the set pressure $\Delta P_{UP}$ after it has been lowered by the set pressure $\Delta P_{DOWN}$, so that the first clutch C1 can always be held in the state immediately before the transfer from the drag region to the slip region.

Incidentally, if the reduction of the C-1 oil pressure $P_{C1}$ is detected when the variation 6 exceeds the threshold value $\Delta N_{RC}$ after the sampling time $T_{sam}$ has been reset, the operation of Step S2-2-9 is executed so that the C-1 oil pressure $P_{C1}$ is lowered by the second pressure reducing means.

When the C-1 oil pressure $P_{C1}$ is lowered by the set pressure $\Delta P_{DOWN}$ the reference rotational difference $\Delta N_m$ is not set. Hence, the variation δ is the difference between the rotational difference $\Delta N$ and the reference rotational difference $\Delta N_m$ preceding by one, so that it basically becomes substantially zero. Hence, the C-1 oil pressure $P_{C1}$ can be raised by the set pressure $\Delta P_{UP}$ after it has been lowered by the set pressure $\Delta P_{DOWN}$. As a result, Step S2-2-9 is hardly executed.

Step S2-2-15: The C-1 oil pressure $P_{C1}$, before having been lowered in Step S2-2-14, is set as the reference C-1 oil pressure $P_{C1m}$ and is stored in memory:

$P_{C1m} \leftarrow P_{C1}$ before lowered.

Step S2-2-16: It is decided whether or not the condition for ending the in-neutral control of the first clutch C1 is satisfied. The in-neutral control routine is ended, if the ending condition is satisfied, but is returned to Step S2-2-4 to repeat the aforementioned operation, if the ending condition is not satisfied.

Figure 25:
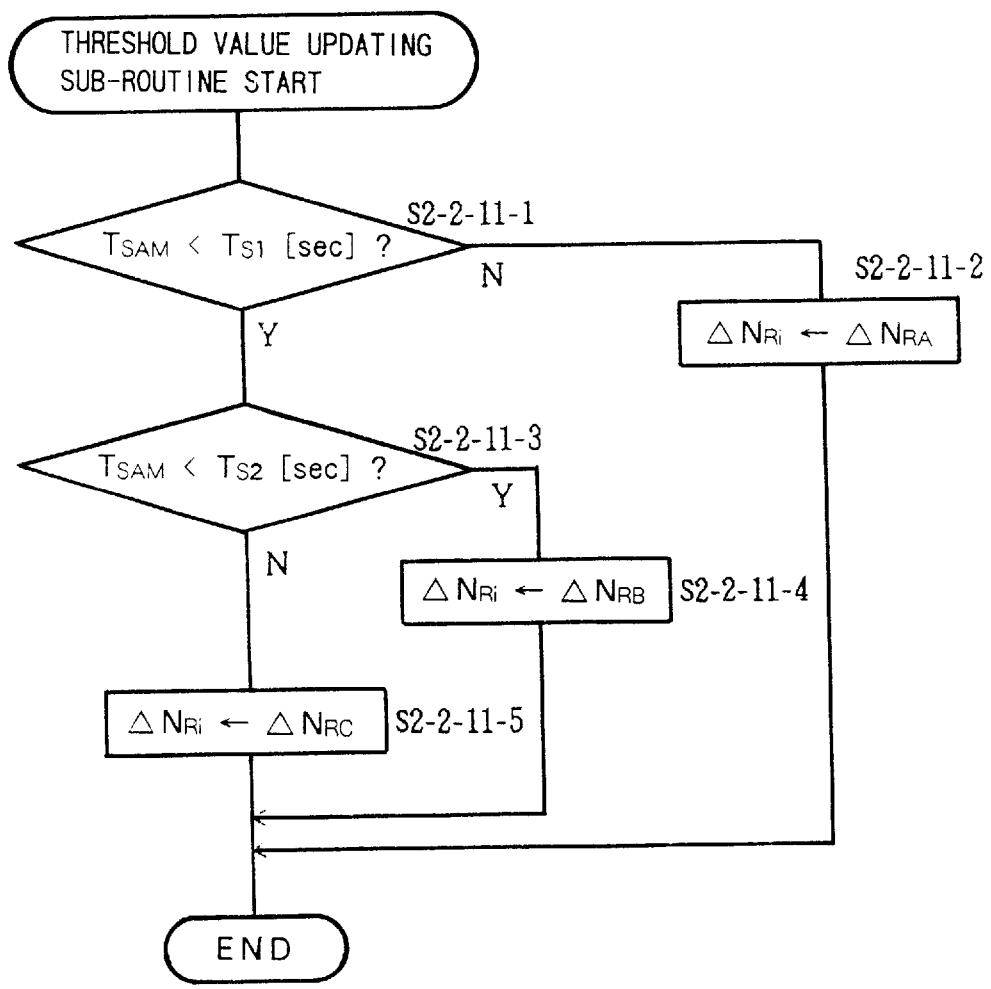
FIG. 25 is a flow chart of a threshold value updating subroutine, i.e. step S2-2-11 in FIG. 23.

Next, the sub-routine for updating the threshold value at Step S2-2-11 of FIG. 23 will be described with reference to FIG. 25. For example, a threshold value $\Delta N_{RA}$ may be set to 15 rpm; threshold value $\Delta N_{RB}$ may be set to 20 rpm; and threshold value $\Delta N_{RC}$ is set to 30 rpm.

Step S2-2-11-1: It is decided whether or not a time period (hereinafter "elapsed time") $T_{sam}$, beginning with the sampling time $T_{SAM}$, is shorter than the time $T_{S1}$. The routine advances to Step S2-2-11-2, if the elapsed time $T_{sam}$ is shorter than the time $T_{S1}$, but to Step S2-2-11-3 if the lapse time $T_{sam}$ is longer than the time $T_{S1}$.

Step S2-2-11-2: The value $\Delta N_{RA}$ is set as the threshold value $\Delta N_{R1}$.

Step S2-2-11-3: It is decided whether or not the elapsed time $T_{sam}$ is shorter than the time $T_{S2}$. The routine advances to Step S2-2-11-4, if the elapsed time $T_{sam}$ is shorter than the time $T_{S2}$, but to Step S2-2-11-5 if the elapsed time $T_{sam}$ is longer than the time $T_{S2}$.

Step S2-2-11-4: The value $\Delta N_{RB}$ is set as the threshold value $\Delta N_{R1}$.

Step S2-2-11-5: The value $\Delta N_{RC}$ is set as the threshold value $\Delta N_{R1}$.

Figure 26:
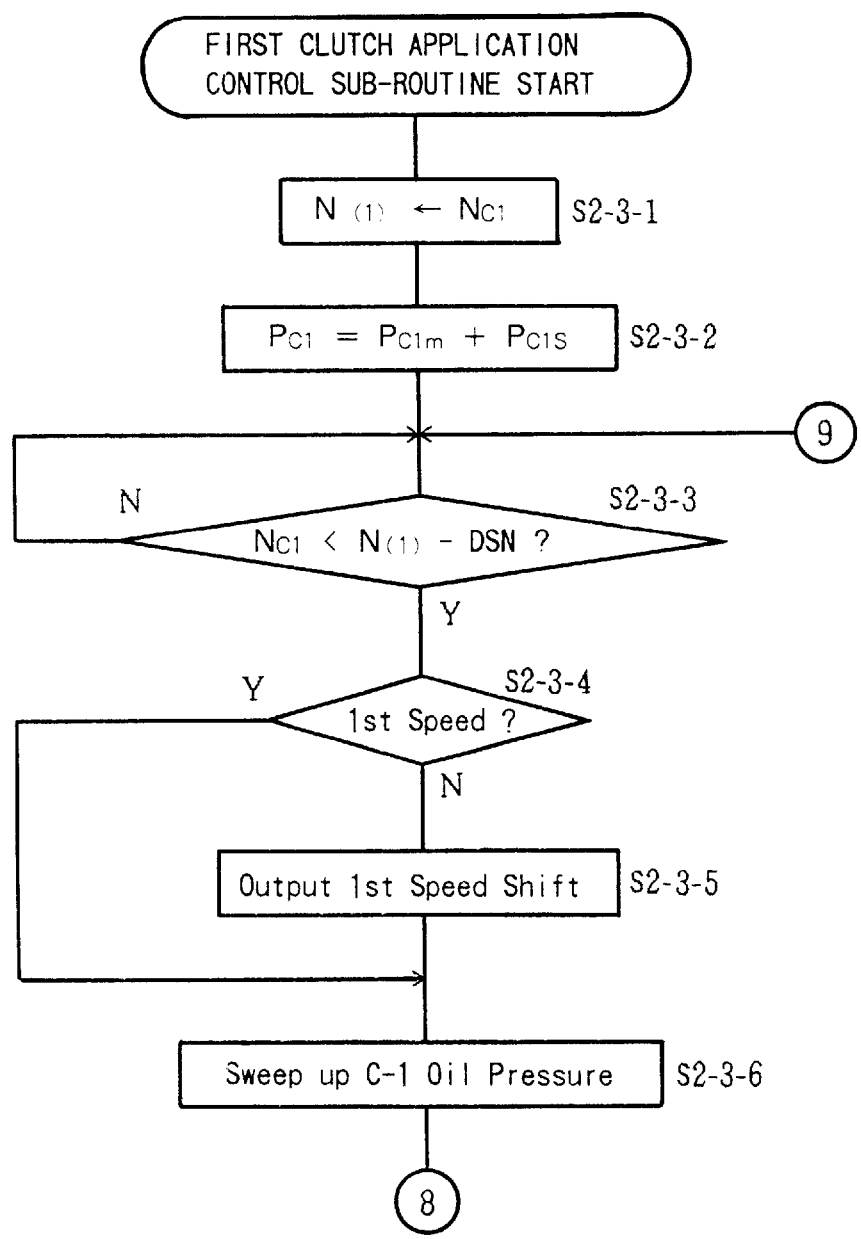
FIGS. 26 and 27 is a first flow chart of a C-1 clutch application control subroutine, i.e. step S2-3 in FIG. 14.
Figure 27:
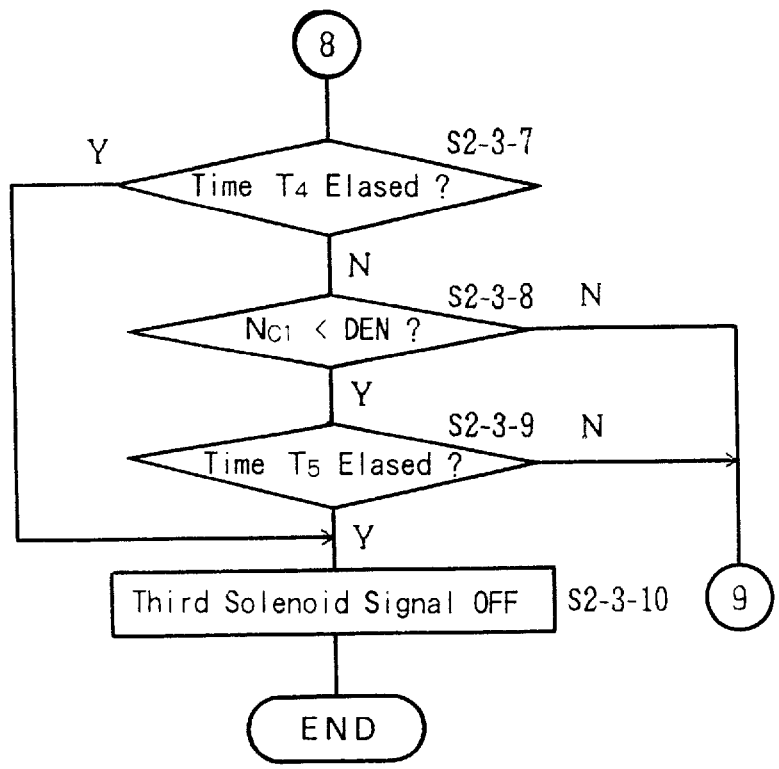

Next, the first clutch application control subroutine at Step S2-3 of FIG. 14 will be described with reference to FIGS. 26 to 28.

Step S2-3-1: The clutch input side RPM $N_{C1}$, at the instant when the ending condition of the in-neutral control is satisfied, is stored as a value $N_{(1)}$ in the memory of the automatic transmission control system 41 (FIG. 2). Simultaneously with this, the timing of the fourth timer is started.

Step S2-3-2: A constant $P_{C1S}$ is added as a shelf pressure to the reference C-1 oil pressure $P_{C1m}$ as the base pressure which is set at Steps S2-2-10 and S2-2-15, and this sum is set as the C-1 oil pressure $P_{C1}$. Incidentally, the additional pressure $P_{C1S}$ is a value determined to move the piston of the hydraulic servo C-1 (FIG. 5) without fail and to reduce the application shock caused by the application of the first clutch C1.

When the driver performs the starting operation which starts the vehicle moving forward from a stop and this operation is detected, the additional pressure $P_{C1S}$ is added to the reference C-1 oil pressure $P_{C1m}$ so that the C-1 oil pressure $P_{C1}$ is raised to bring the first clutch C1 into a partially applied state. Subsequently, the C-1 oil pressure $P_{C1}$ is further raised to bring the first clutch C1 into the completely applied state.

Step S2-3-3: The control routine pauses until the clutch input side RPM $N_{C1}$ becomes smaller than the remainder obtained by subtracting the value $N_{(1)}$ from a constant DSN. If the clutch input side RPM $N_{C1}$ becomes smaller than this remainder, the routine decides the start of application of the first clutch C1 and advances to Step S2-3-4.

Step S2-3-4: It is decided whether or not the gear stage is at the 1st speed. The routine advances to Step S2-3-6, if at the 1st speed, but to Step S2-3-5 if not at the 1st speed.

Step S2-3-5: The 1st speed shift output signal is generated.

Step S2-3-6: The throttle pressure $P_{TH}$ from the linear solenoid valve 66 (FIG. 4) is changed, and the C-1 oil pressure $P_{C1}$ is swept up. After this, the C-1 oil pressure $P_{C1}$ is raised by a set pressure $\Delta P_B$ at each lapse of a time $\Delta t_B$, to continue the application of the first clutch C1.

Step S2-3-7: It is decided whether or not a time period $T_4$, as timed by the fourth timer, has elapsed. The routine advances to Step S2-3-10, if the time $T_4$ has elapsed, but to Step S2-3-8 if the time $T_4$ has not elapsed.

Step S2-3-8: It is decided whether or not the clutch input side RPM $N_{C1}$ is below a constant DEN.

The routine advances to Step S2-3-9, if the clutch input side RPM $N_{C1}$ is over the constant DEN, but returns to Step S2-3-3 if the clutch input side RPM $N_{C1}$ is below the constant DEN. Incidentally, if it is decided that the clutch input side RPM $N_{C1}$ is below the constant DEN, the fifth timer starts the timing.

Step S2-3-9: It is decided whether or not a time period $T_5$, as timed by the fifth timer, has elapsed. The routine advances to Step S2-3-10, if the time $T_5$ elapsed, but returns to Step S2-3-3 if the time $T_5$ has not elapsed.

Figure 28:
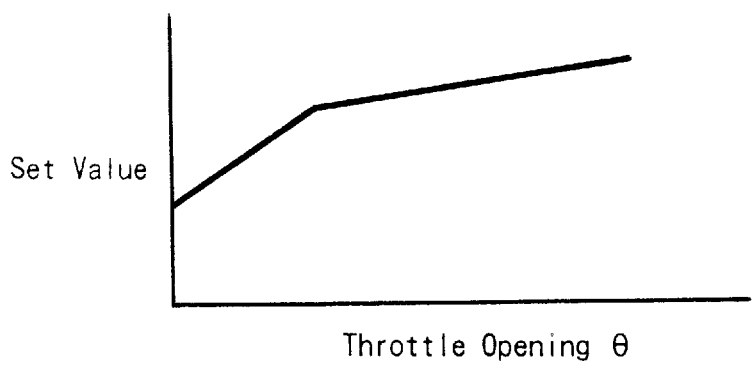
FIG. 28 is a graph of the relationship between a throttle opening θ (abscissa) and a set value (ordinate).

In this case, the set values such as the additional pressure $P_{C1S}$, the pressure $P_B$ or the set pressure $\Delta P_B$ are set, as shown in FIG. 28, on the basis of a variable such as the throttle opening θ, as corresponding to the input torque $T_T$.

Step S2-3-10: The third solenoid signal $S_3$ is turned OFF.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A control system for an automatic transmission which receives torque from an engine, comprising:

a speed change unit;

a clutch engagable, responsive to selection of a forward running range, to transmit the rotation of the engine to the speed change unit;

a hydraulic servo for applying/releasing said clutch responsive to an oil pressure; and a control unit for controlling the oil pressure fed to said hydraulic servo, said control unit comprising:

application detecting means for detecting the application starting pressure received by the hydraulic servo at the instant when the application of said clutch is actually started;

initial application pressure setting means for setting an initial application pressure, as the oil pressure fed to the hydraulic servo, on the basis of the application starting pressure which is detected by said application detecting means; and oil pressure adjusting means for adjusting the oil pressure fed to said hydraulic servo responsive to a change made in said forward running range, and for gradually raising the oil pressure fed to said hydraulic servo.

2. A control system according to claim 1, further comprising:

a fluid transmission unit arranged between the engine and said clutch;

input RPM detecting means for detecting the input RPM of said fluid transmission unit;

output RPM detecting means for detecting the output RPM of said fluid transmission unit; and stop state detecting means for detecting a vehicle stop state in which the vehicle speed is substantially zero and defined by selection of a forward running range, a fully closed throttle and a depressed brake pedal.

3. A control system according to claim 2 wherein said control unit further comprises:

calculation means for calculating the difference in rotational speed between said input RPM and said output RPM;

release means for releasing said clutch by lowering the oil pressure fed to said hydraulic servo until start of retraction of the piston of said hydraulic servo, responsive to detection of said vehicle stop state; and specific release state holding means for holding said clutch in a state which immediately precedes the transition of said clutch from a drag region to a slip region, until said vehicle stop state is no longer detected after the release of said clutch.

4. A control system according to claim 3 wherein said specific release state holding means comprises:

booster means for raising the oil pressure fed to said hydraulic servo by a set pressure, unless the rate of change of said rotational speed difference exceeds a reference rate of change after lapse of a set time period; and first pressure reducing means for lowering the oil pressure fed to said hydraulic servo, by a set pressure responsive to an increase in said rotational speed difference at a rate of change exceeding said reference rate, irrespective of the lapse of said set time.

5. A control system according to claim 4 wherein said application detecting means detects, when the oil pressure fed to said hydraulic servo is first raised by a set pressure by said booster means and then lowered by a set pressure by said first pressure reducing means, the oil pressure immediately preceding the lowering as said application starting pressure.

6. A control system according to claim 4, wherein said reference rate of change is set at a value between a standard rate of change when said clutch is in the drag region and a standard rate of change when said clutch is in the slip region.

7. A control system according to claim 2, wherein said set time period is set to correspond to a time period extending from initiation of change in the oil pressure fed to the hydraulic servo until the actual change of the oil pressure ends.

8. A control system according to claim 4, wherein said release means includes second pressure reducing means for reducing the oil pressure fed to said hydraulic servo responsive to detection of said rate of change exceeding the reference rate of change and a decrease in said rotational speed difference.

9. A control system according to claim 1, further comprising torque detecting means for detecting the output torque from the engine, wherein said initial application pressure setting means adds an additional pressure to said application starting pressure and increases the additional pressure responsive to increase in the detected output torque.

10. A control system according to claim 1, further comprising oil temperature detecting means for detecting oil temperature, wherein said initial application pressure setting means adds an additional pressure to said application starting pressure and decreases the additional pressure responsive to an increase in the detected oil temperature.

11. A control system according to claim 1, further comprising application detecting means for detecting the start of application of said clutch, wherein said oil pressure adjusting means sets the oil pressure to be fed to said hydraulic servo to said initial application pressure until the start of application is detected by said application detecting means, and gradually raises the oil pressure fed to said hydraulic servo from the initial application pressure.

12. A control system according to claim 1 further comprising:

a speed detector for detecting speed of the rotation of the engine;

a memory storing values for increments of additional pressure correlated with values for speed of rotation of the engine; and wherein said initial application pressure setting means sets, as the initial application pressure, the sum of a reference pressure which is an application starting pressure previously detected by said application detecting means and an oil pressure increment retrieved from said memory and corresponding to the detected speed of rotation of the engine.

13. A control system according to claim 1 further comprising:

a memory storing values for said application starting pressure correlated with values for input torque to the transmission; and wherein said application detecting means determines said input torque to the transmission and retrieves from memory a value for application starting pressure corresponding to the determined input torque, as the detected application starting pressure.

* * * * *

UNITED STATES PATENT AND TRADEMARK OFFICE
CERTIFICATE OF CORRECTION

PATENT NO. : 5,813,943
DATED : September 29, 1998
INVENTOR(S) : KOUSAKA et al

It is certified that error appears in the above-indentified patent and that said Letters Patent is hereby corrected as shown below:

Col. 7, line 24, delete "20".

Col. 21, line 28, delete "6" and insert -- $\delta$ --.

Signed and Sealed this

Thirty-first Day of August, 1999

Attest:

Q. TODD DICKINSON

*Attesting Officer*   *Acting Commissioner of Patents and Trademarks*